(12) United States Patent
Nakajima

(10) Patent No.: US 9,150,009 B1
(45) Date of Patent: Oct. 6, 2015

(54) PRINTING APPARATUS, PRINTING METHOD, AND PROGRAM

(71) Applicant: CANON KABUSHIKI KAISHA, Tokyo (JP)

(72) Inventor: Yoshinori Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/668,756

(22) Filed: Mar. 25, 2015

(30) Foreign Application Priority Data

Mar. 28, 2014 (JP) .................................. 2014-069578

(51) Int. Cl.
*B41J 2/045* (2006.01)
*B41J 11/00* (2006.01)

(52) U.S. Cl.
CPC .......... *B41J 2/04508* (2013.01); *B41J 2/04586* (2013.01); *B41J 11/0085* (2013.01)

(58) Field of Classification Search
CPC .. B41J 2/0458; B41J 2/04591; B41J 11/0085; B41J 2/04508; B41J 2/04551
USPC ........................ 347/9, 12, 14, 16, 40, 78, 101
See application file for complete search history.

(56) References Cited

U.S. PATENT DOCUMENTS 7,530,656 B2 * 5/2009 Endo et al. ...................... 347/16
8,596,748 B2 * 12/2013 Itogawa ........................... 347/21

FOREIGN PATENT DOCUMENTS

JP       2004-168003 A    6/2004
JP       2013-014047 A    1/2013

* cited by examiner

*Primary Examiner* — Thinh Nguyen
(74) *Attorney, Agent, or Firm* — Canon USA Inc. IP Division

(57) ABSTRACT

A discharge amount of ink is corrected so that thinning rates of a discharge amount of ink to be discharged to an end portion on an upstream side in a scanning direction are larger than thinning rates of a discharge amount of ink to be discharged to an end portion on a downstream side in the scanning direction.

20 Claims, 17 Drawing Sheets

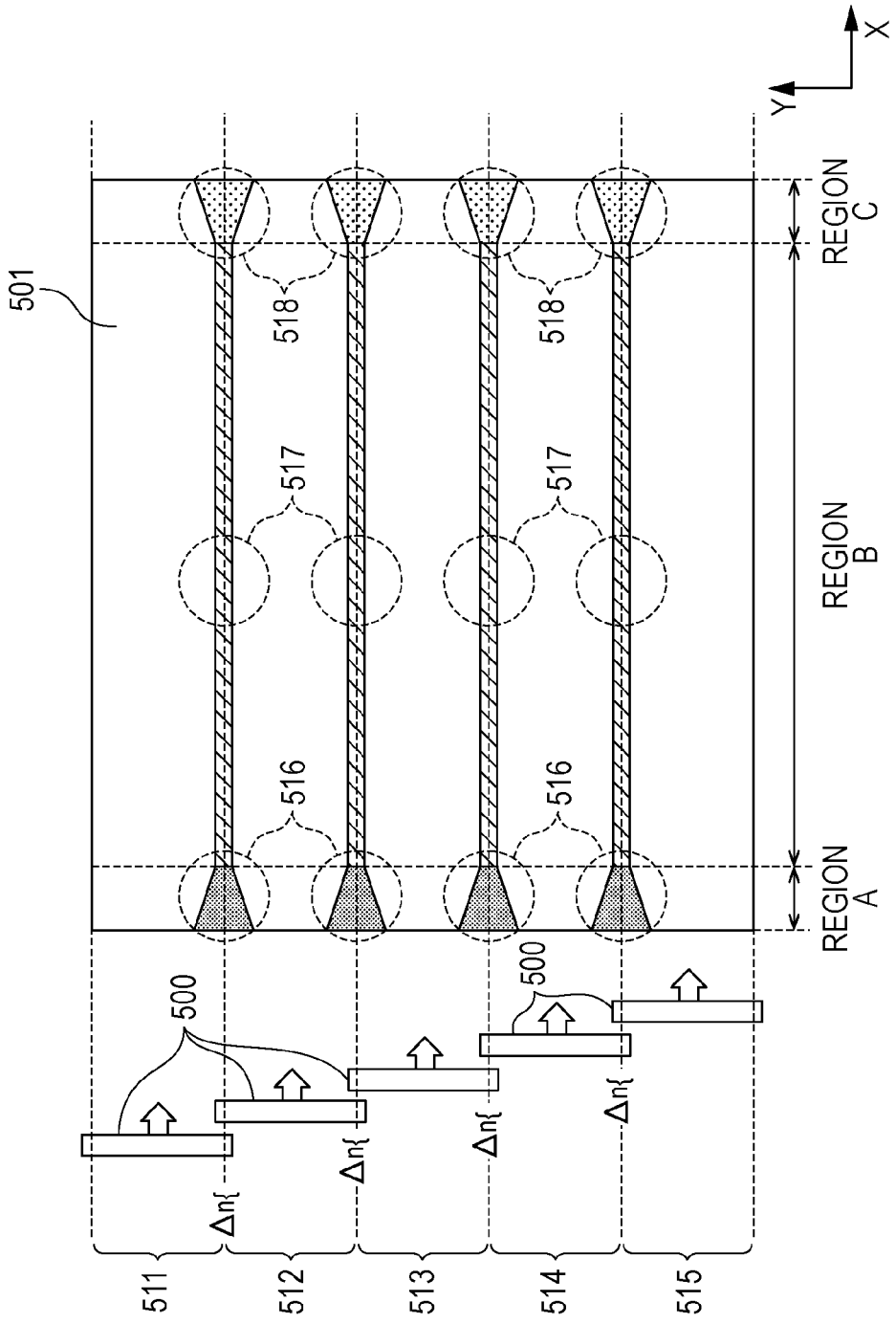

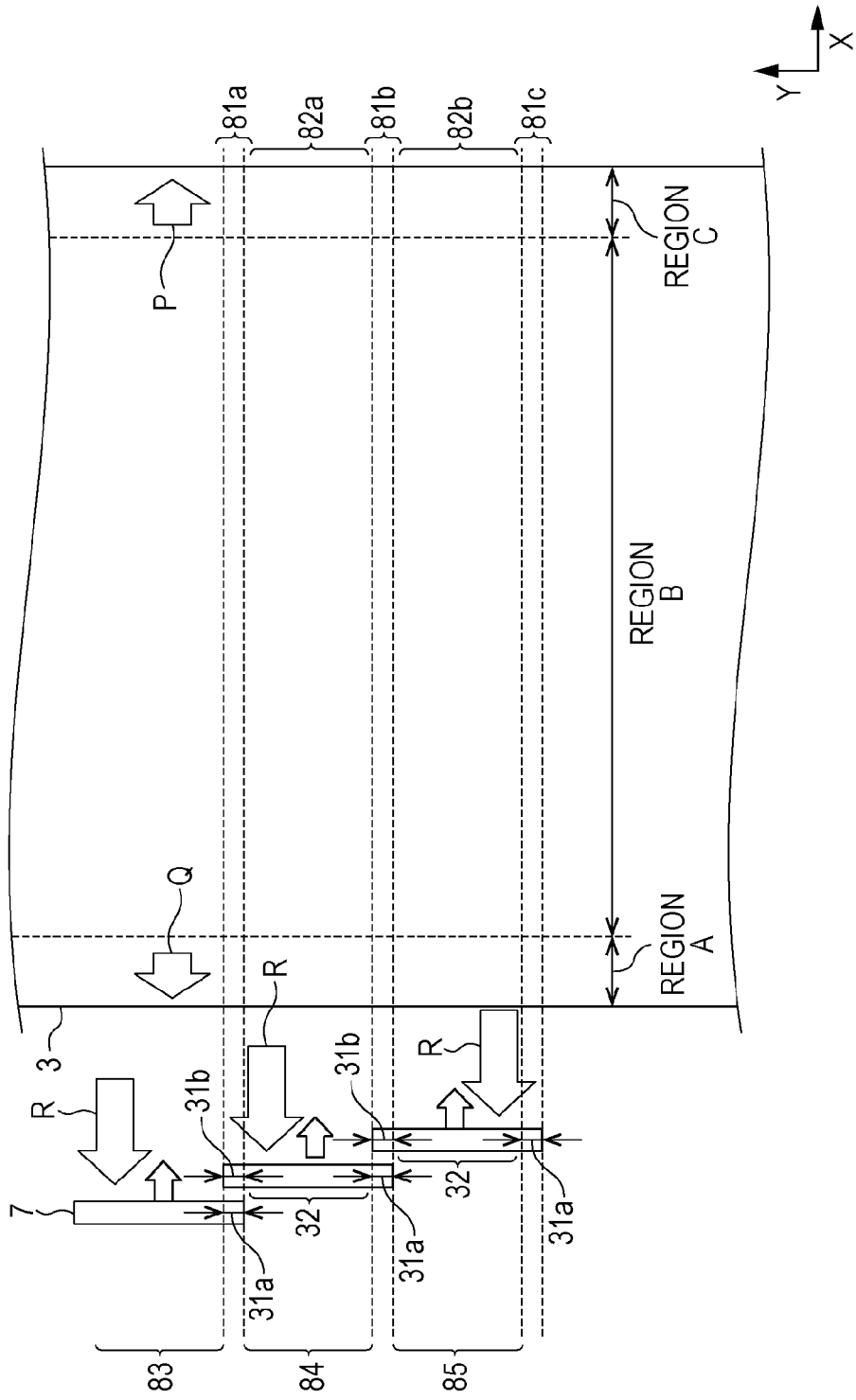

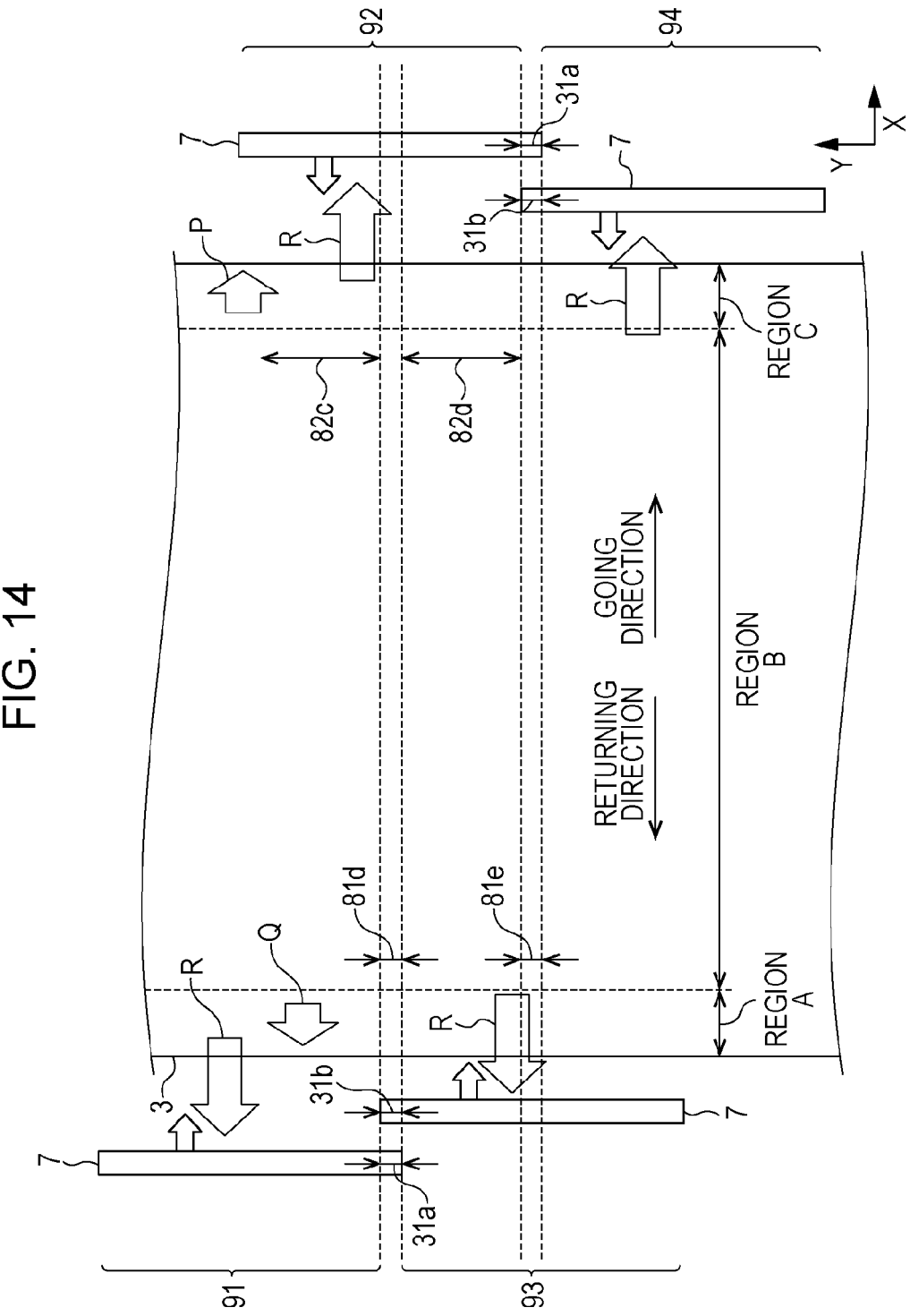

PRINTING APPARATUS, PRINTING METHOD, AND PROGRAM

BACKGROUND OF THE INVENTION

1. Field of the Invention

The present invention relates to a printing apparatus, a printing method, and a program.

2. Description of the Related Art

In general, printing apparatuses which print an image by discharging ink on a printing medium supported by a platen while a printing head having a discharge port array including a plurality of discharge ports which are arrayed is moved in a scanning direction for scanning and conveying the printing medium in a conveyance direction during the scanning have been used.

In such a printing apparatus, when an ink discharge amount per discharge is large, a deviation phenomenon of discharged ink droplets described below is likely to occur. Ink droplets discharged from a printing head drop while involving air existing in a space between the printing head and a printing medium, and accordingly, the space between the printing head and the printing medium becomes in a depressurized state after the discharge of ink. To correct the depressurized state, air in portions in the vicinity of end portions of the discharge port array moves toward the center of the discharge port array, and accordingly, airflows (hereinafter referred to as a "self-airflow" where appropriate) are generated toward the center from the end portions. Due to the self-airflow, a so-called end deviation phenomenon in which ink droplets discharged from discharge ports in end portions of the discharge port array are attracted toward the center of the discharge port array occurs. Note that the larger a discharge amount of ink per discharge is, the larger the self-airflow is, and accordingly, a degree of the end deviation phenomenon of ink droplets is large. Due to the end deviation phenomenon, ink is not attached on regions of the printing medium which is to be printed by discharge ports in the end portions of the discharge port array, and white streaks may appear in a printed image.

Japanese Patent Laid-Open No. 2004-168003 discloses a technique of reducing a conveyance amount of a printing medium relative to a standard amount and reducing a discharge amount of ink from discharge ports in end portions of a discharge port array so that generation of while streaks is suppressed. According to Japanese Patent Laid-Open No. 2004-168003, the printing medium is conveyed such that a discharge port of one end portion of the discharge port array and a discharge port of the other end portion of the discharge port array perform printing on the same region of the printing medium by different scanning operations, and therefore, white streaks generated when a discharge amount of ink is relatively large as described above may be suppressed. Furthermore, when the discharge amount of ink is relatively small, the self-airflow is not generated, and accordingly, black streaks may be generated in a printed image due to the conveyance amount smaller than the standard amount. On the other hand, according to Japanese Patent Laid-Open No. 2004-168003, when a discharge amount of ink is relatively small, the generation of black streaks described above is suppressed by performing correction so that a discharge amount of ink from the discharge ports in the end portions is reduced.

Furthermore, in general, droplet landing accuracy of ink may be deteriorated since a printing medium is lifted relative to a platen which supports the printing medium at a time of printing. Japanese Patent Laid-Open No. 2013-014047 discloses a technique of providing a plurality of suction holes in a platen which supports a printing medium and absorbing the printing medium on the platen by suctioning air through the suction holes.

However, in a printing apparatus having suction means disclosed in Japanese Patent Laid-Open No. 2013-014047, even when the printing method disclosed in Japanese Patent Laid-Open No. 2004-168003 is used, white streaks and black streaks described above may not be efficiently suppressed.

This problem will be described in detail hereinafter.

FIGS. 1A to 1C are diagrams illustrating a state in which strength of an airflow flowing in a space between a printing head 500 and a printing medium 501 obtained when the printing head 500 performs scanning once is changed depending on a position of the printing head 500.

Note that a case where a printing apparatus which prints an image by discharging ink in a vertical downward direction while the printing head 500 having a discharge port array including a plurality of discharge ports arranged in a Y direction (array direction) is moved toward an X direction (scanning direction) is used is illustrated in FIGS. 1A to 1C. Here, a platen 502 which supports the printing medium 501 has a plurality of suction holes 503 formed therein and absorbs the printing medium 501 on the platen 502 by suctioning air through the suction holes 503. Although a platen 2 having only three suction holes 503 is illustrated in FIGS. 1A to 1C for simplicity, a larger number of suction holes 503 are formed in general apparatuses.

FIG. 1A is a diagram illustrating a state in which ink is discharged to a region in the vicinity of an end portion on an upstream side of the printing medium 501 in an X direction immediately after a certain scanning operation is performed once in the X direction of the printing head 500. Since the printing head 500 moves in the X direction for the scanning, airflow 504 is generated from a downstream side to the upstream side in the scanning direction of the printing head 500 in a space between the printing head 500 and the printing medium 501. Furthermore, since air is suctioned through the suction holes 503, an eddy of air is generated toward the suction holes 503 in portions in the vicinity of the suction holes 503. Since the portion in the vicinity of the end portion of the printing medium 501 on the upstream side in the X direction is located near one of the suction holes 503, the portion is affected by the eddy of air, and therefore, an airflow 505 is generated from the downstream side to the upstream side of the scanning direction in the portion between the printing head 500 and the printing medium 501. Specifically, immediately after the certain scanning operation relative to the printing medium 501 is started, an airflow obtained by adding the airflow 504 caused by the scanning and the airflow 505 caused by the suction to each other may be generated in the portion between the printing head 500 and the printing medium 501.

FIG. 1B is a diagram illustrating a state in which the printing head 500 discharges ink to a center region (also referred to as a "region B" hereinafter) in the middle of the certain scanning operation in the X direction. As with the case of FIG. 1A, the airflow 504 is generated from the downstream side to the upstream side in the scanning direction in the space between the printing head 500 and the printing medium 501. On the other hand, since the space between the printing head 500 and the printing medium 501 corresponding to the center region is not in contact with the suction holes 503, the center region is not affected by eddy of air caused by suction through the suction holes 503. Specifically, in the case of FIG. 1B, only the airflow 504 caused by the scanning may be generated in the space between the printing head 500 and the printing medium 501.

FIG. 1C is a diagram illustrating a state when ink is discharged to a region (also referred to as a "region C" hereinafter) in the vicinity of an end portion on the downstream side in an X direction of the printing medium 501 immediately after the certain scanning operation is performed in the X direction. Also in this case, the airflow 504 caused by the scanning is generated in the space between the printing head 500 and the printing medium 501. Unlike the state illustrated in FIG. 1A, one of the suction holes 503 is formed on the downstream side in the X direction relative to the printing head 500 in the state illustrated in FIG. 1C. Therefore, the region is affected by eddy of air through the suction holes 503, and airflow 506 may be generated from the upstream side to the downstream side in the space between the printing head 500 and the printing medium 501. In this way, in the state illustrated in FIG. 1C, the airflow 504 caused by the scanning and the airflow 506 caused by the suction are generated in opposite directions. Specifically, immediately before the certain scanning operation performed on the printing medium 501 is terminated, an airflow obtained by subtraction between the airflow 506 caused by the suction from the airflow 504 caused by the scanning may be generated in the space between the printing head 500 and the printing medium 501.

FIGS. 2A to 2C are diagrams illustrating end deviation phenomena and degrees of the end deviation phenomena corresponding to the positional relationships between the printing head 500 and the printing medium 501 illustrated in FIGS. 1A to 1C, respectively.

Note that, in FIGS. 2A to 2C, states in which the space between the printing head 500 and the printing medium 501 is viewed from the downstream side in the X direction relative to the printing head 500 are illustrated. For simplicity, a case where ink discharge amounts in the states of FIGS. 2A to 2C are substantially the same as one another is described. Furthermore, sizes of circles representing incoming airflows 507 to 509 illustrated in FIGS. 2A to 2C schematically represent strengths of the incoming airflows 507 to 509.

As described above, in the state illustrated in FIG. 2A, the airflow 507 generated in the space between the printing head 500 and the printing medium 501 (hereinafter referred to as an "incoming airflow") is obtained by adding the airflow 504 caused by the scanning and the airflow 505 caused by the suction to each other, and therefore, the airflow 507 is relatively strong. Accordingly, even when the space between the printing head 500 and the printing medium 501 becomes a depressurized state, the depressurized state is corrected by the airflow 507 or the space becomes a surge pressure state depending on a strength of the incoming airflow 507. Consequently, ink droplets discharged from one of the end portions of the discharge port array is shifted toward an outside of the discharge port array.

On the other hand, in the state illustrated in FIG. 2B, a strength of an incoming airflow 508 is middle. Therefore, correction of the depressurized state by the incoming airflow 508 is not remarkably performed when compared with the state illustrated in FIG. 2A. Accordingly, an amount of shift of ink droplets discharged from the other of the end portions of the discharge port array is smaller than that in the state of FIG. 2A.

Furthermore, in the state of FIG. 2C, the airflow 506 caused by the suction is generated in the direction opposite to the direction of the airflow 504 caused by the scanning, and therefore, an incoming airflow 509 is relatively weak. Therefore, correction of the depressurized state by the incoming airflow 509 is not remarkably performed when compared with the cases of FIGS. 2A and 2B. However, a depressurized state caused by flowing of air in a portion in the vicinity of the other of the end portions of the discharge port array in the array direction toward the center of the discharge port array is remarkably corrected. Consequently, ink droplets discharged from the other of the end portions of the discharge port array land in positions shifted toward the center of the discharge port array. Note that, since the incoming airflow 504 contributes a little to the correction of the depressurized state, a degree of the shift of the ink droplets toward the center of the discharge port array is small when compared with a case where any airflow is not generated.

FIG. 3 is a diagram schematically illustrating an image printed by discharging ink by one scanning operation performed by the printing head 500. For simplicity, a case where printing is performed by one scanning operation on each unit region of the printing medium 501 is described. Furthermore, to suppress generation of white streaks caused by the end deviation phenomenon, the printing medium 501 is conveyed such that a predetermined number of discharge ports Δn may discharge ink in the same regions on the printing medium 501 in different scanning operations. Specifically, positions 511 to 515 in FIG. 3 correspond to first to fifth scanning operations performed on the printing medium 501, and the printing medium 501 is conveyed such that the printing head 500 and the printing medium 501 have these positional relationships in the individual scanning operations.

Here, as described above, in any of the case where printing is performed on the end region on the upstream side (region A) in the X direction of the printing medium 501, the case where printing is performed on the center region (region B), and the case where printing is performed on the end region on the downstream side (region C), influence of an incoming airflow is generated. Therefore, a shift amount toward the end portion of the discharge port array in a Y direction is larger when compared with a case where an incoming airflow is not generated in the region A, the region B, or the region C. Accordingly, even in a case where a discharge amount of ink from discharge ports in the end portions of the discharge port array in the array direction is reduced by a method disclosed in Japanese Patent Laid-Open No. 2004-168003, black streaks are generated in all the regions A to C.

Furthermore, as illustrated in FIGS. 2A to 2C, amounts of shift toward the end portion of the discharge port array in the Y direction becomes large in order from the region A, the region B, to the region C. Accordingly, a density of black streaks 517 generated in the region B is higher than that of black streaks 518 generated in the region C. Furthermore, a density of black streaks 516 generated in the region A is further higher than those of the black streaks 517 and 518 generated in the regions B and C, respectively.

As described above, when printing is performed by a printing apparatus having a suction unit, a magnitude of an incoming airflow varies depending on a position of a printing head in a scanning direction. Therefore, densities of boundary streaks generated in regions on a printing medium corresponding to discharge ports in end portions of a discharge port array in an array direction are different from one another depending on the positions.

SUMMARY OF THE INVENTION

The present invention provides a printing apparatus capable of printing an image which is less affected by boundary streaks generated due to different densities depending on scanning directions caused by different strengths of incoming airflows.

Accordingly, the present invention provides a printing apparatus including a printing head including a discharge port array which includes a plurality of discharge ports for discharging ink arranged in an array direction, a suction unit configured to suction air through suction holes so as to attract a printing medium, a scanning unit configured to cause the printing head to perform a plurality of scanning operations relative to the printing medium in a scanning direction which is orthogonal to the array direction, a supporting unit which includes the suction holes formed therein in a range having a width in the scanning direction larger than a width of the printing medium in the scanning direction and which is configured to support the printing medium, a conveying unit configured to convey the printing medium in a conveyance direction which is orthogonal to the scanning direction relative to the printing head such that a predetermined number of first discharge ports arranged in one end portion of the discharge port array in the array direction in a first scanning operation in the plurality of scanning operations and a predetermined number of second discharge ports arranged in the other end portion in the discharge port array in the array direction in a second scanning operation which is performed after the first scanning operation in the plurality of scanning operations performed by the printing head discharge ink in the same region or substantially the same region in the printing medium, an obtaining unit configured to obtain information on discharge amounts of ink discharged on the printing medium in the individual scanning operations, a correction unit configured to perform correction by reducing a discharge amount of ink discharged from the predetermined number of first discharge ports in the first scanning operation and a discharge amount of ink discharged from the predetermined number of second discharge ports in the second scanning operation which are represented by the information obtained by the obtaining unit using reduction rates in accordance with a position of the printing head in the scanning direction, and a controller configured to perform control such that ink is discharged in accordance with a discharge amount of ink corrected by the correction unit. As for the discharge amount of ink discharged from the predetermined number of first discharge ports in the first scanning operation, the reduction rates in a case where the printing head is located in a first position in the scanning direction are larger than the reduction rates in a case where the printing head is located in a second position in the scanning direction which is on a downstream side in the scanning direction in the first scanning operation relative to the first position.

Further features of the present invention will become apparent from the following description of exemplary embodiments with reference to the attached drawings.

BRIEF DESCRIPTION OF THE DRAWINGS

FIG. 3 is a diagram schematically illustrating boundary streaks generated in a case where an incoming airflow is generated.

FIG. 10 is a diagram illustrating the printing method according to the first embodiment.

FIG. 14 is a diagram illustrating a printing method according to a second embodiment.

DESCRIPTION OF THE EMBODIMENTS

First Embodiment

A first embodiment of the present invention will be described in detail hereinafter.

Figure 1A:
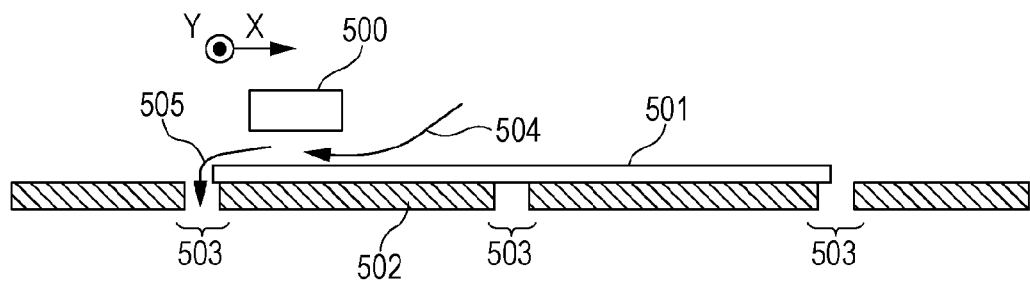
FIGS. 1A to 1C are diagrams schematically illustrating incoming airflows in different printing positions.
Figure 1B:
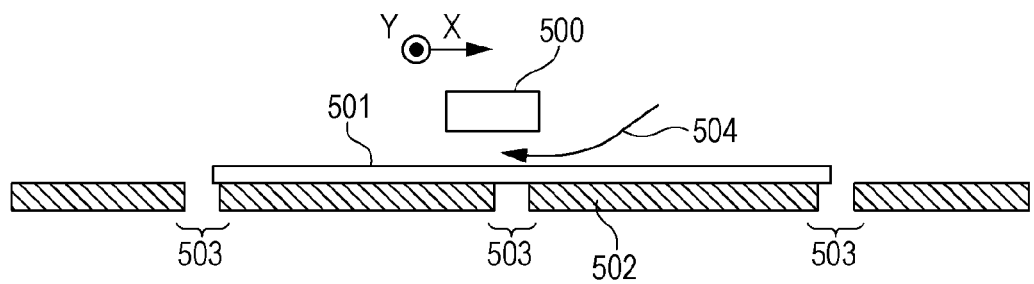
Figure 1C:
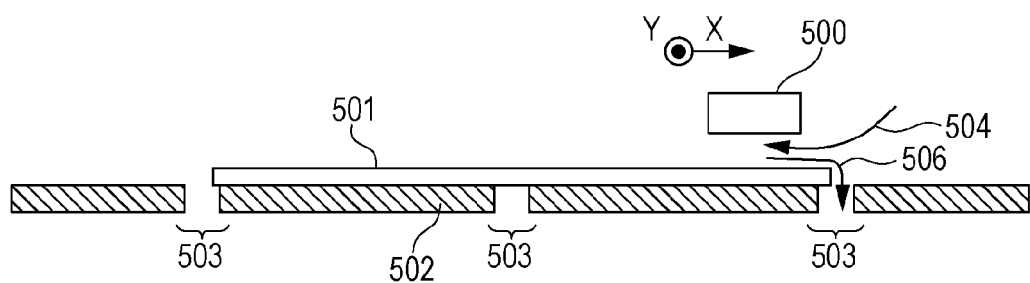
Figure 2A:
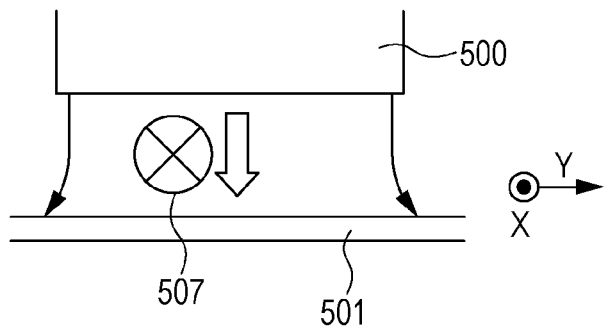
FIGS. 2A to 2C are diagrams schematically illustrating degrees of end deviations in the different printing positions.
Figure 2B:
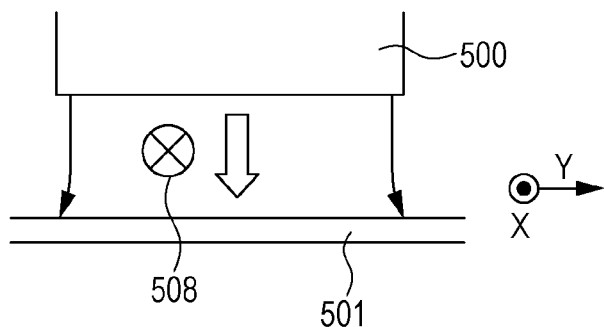
Figure 2C:
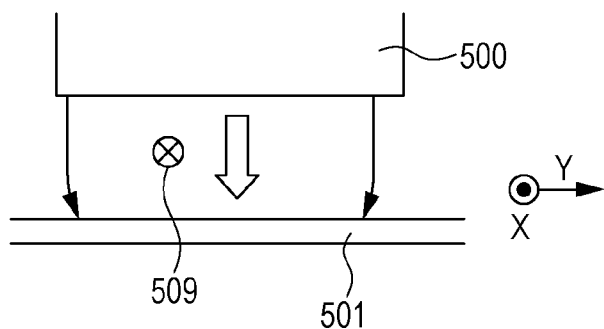
Figure 4:
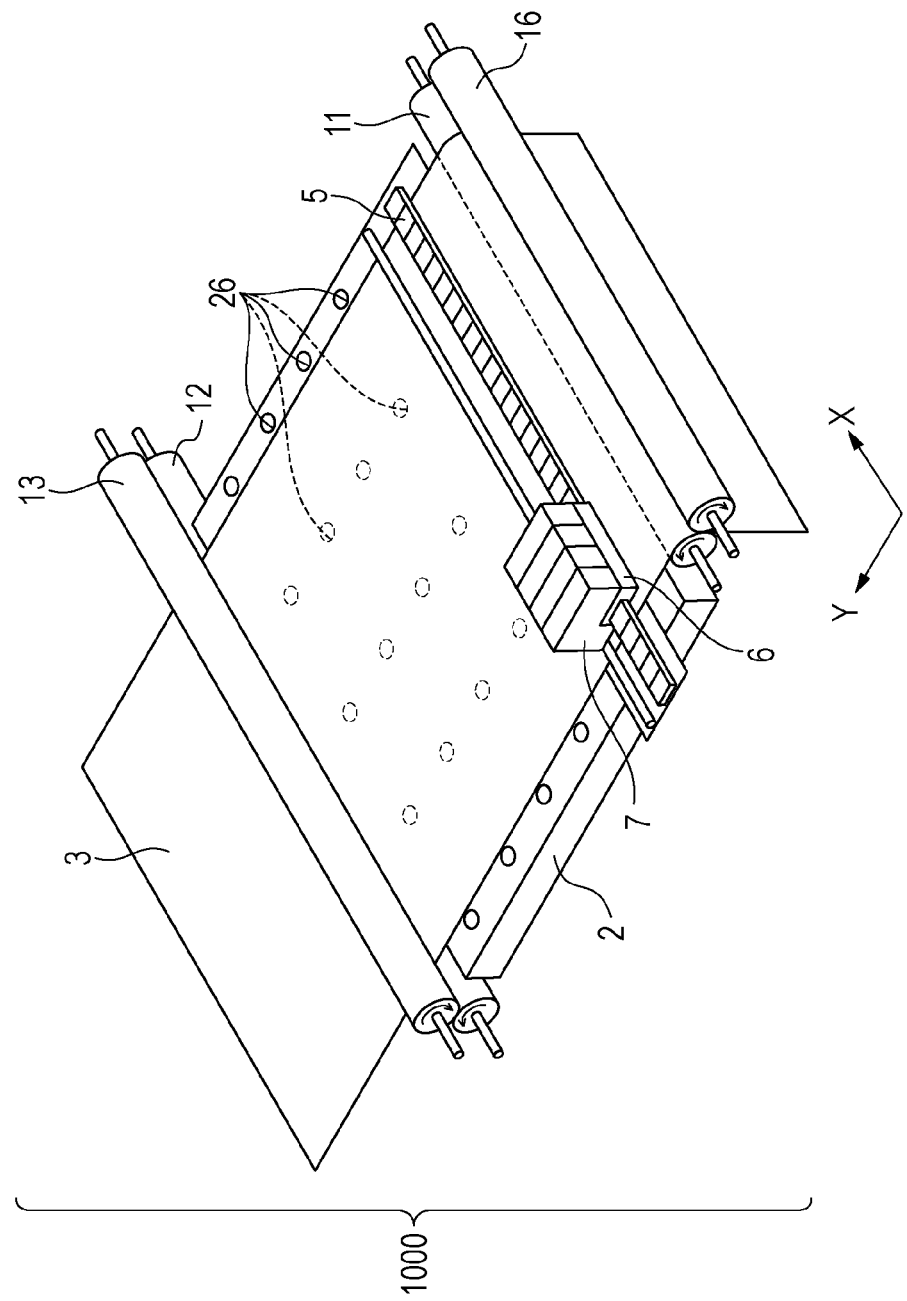
FIG. 4 is a perspective view of a printing apparatus according to a first embodiment.
Figure 5:
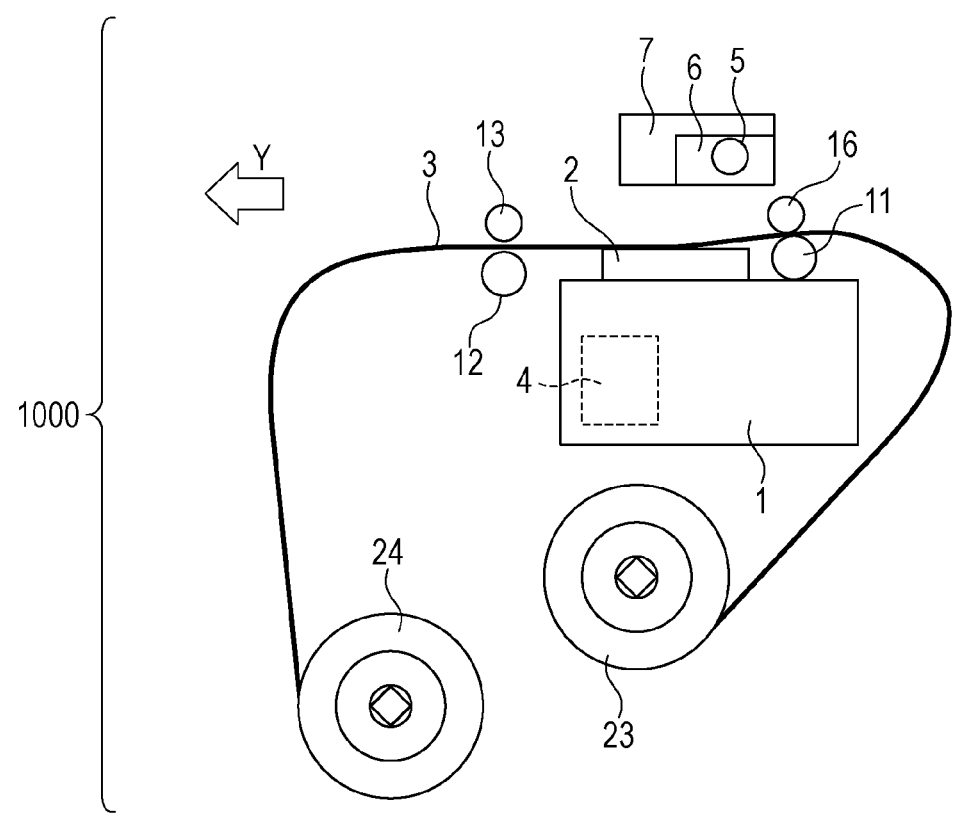
FIG. 5 is a side view of the printing apparatus according to the embodiment.

FIG. 4 is a perspective view of an internal configuration of a printing apparatus 1000 according to this embodiment. FIG. 5 is a side view of the internal configuration of the printing apparatus 1000 according to this embodiment.

The printing apparatus 1000 includes a platen (supporting unit) 2 which supports a printing medium 3. A large number of suction holes 26 are formed on the platen 2 so that the printing medium 3 is absorbed on the platen 2 so as not to be lifted. The suction holes 26 are connected to a duct 4. A suction fan (not illustrated) is disposed below the duct 4. The suction fan suctions air so that the printing medium 3 is absorbed by the platen 2.

Furthermore, a carriage 6 which reciprocally moves in an X direction (scanning direction) is supported by a main rail 5. The carriage 6 includes an ink-jet printing head 7 mounted thereon which will be described hereinafter. Various inkjet printing methods including a thermal jet method using a heating element and a piezo method using a piezoelectric element may be employed in the printing head 7.

The printing medium 3 which is rolled on a feed roller 23 is successively supplied. Then the supplied printing medium 3 is conveyed by a first conveyance roller and a second conveyance roller which are disposed at a certain interval by a predetermined amount in a Y direction (conveyance direction) which is orthogonal to the X direction at a timing corresponding to scanning performed by the printing head 7. The first conveyance roller includes a pair of rollers, that is, a driving roller 11 which is driven by a stepping motor (not illustrated) and an auxiliary roller 16 which rotates with rotation of the driving roller 11. Similarly, the second conveyance roller also includes a pair of rollers, that is, a driving roller 12 and an auxiliary roller 13. Furthermore, the printing medium 3 is rolled on a winding roller 24 through a turn roller. Note that the printing apparatus 1000 may perform printing on a printing medium 3 which is cut into a predetermined size and which is piled on a cassette instead of the rolled printing medium 3.

With this configuration, since ink is discharged from discharge ports of the printing head 7 in accordance with printing data described below while scanning is performed in the X direction, the printing may be performed on the printing medium 3 by forming dots of the ink. The printing head 7 moves to a home position where appropriate and performs a recovery operation using a discharge recovery device (not illustrated) disposed in the home position so as to recover from a defective discharge state caused by clogging of the discharge ports or the like. Suction of ink in which concentration thereof is changed and an ink concentration resetting operation performed by preliminary discharge which are performed to address variation of concentration of the ink which remains near the discharge ports of the printing head 7 before scanning is performed using the printing head 7 are also performed in the home position.

Figure 6:
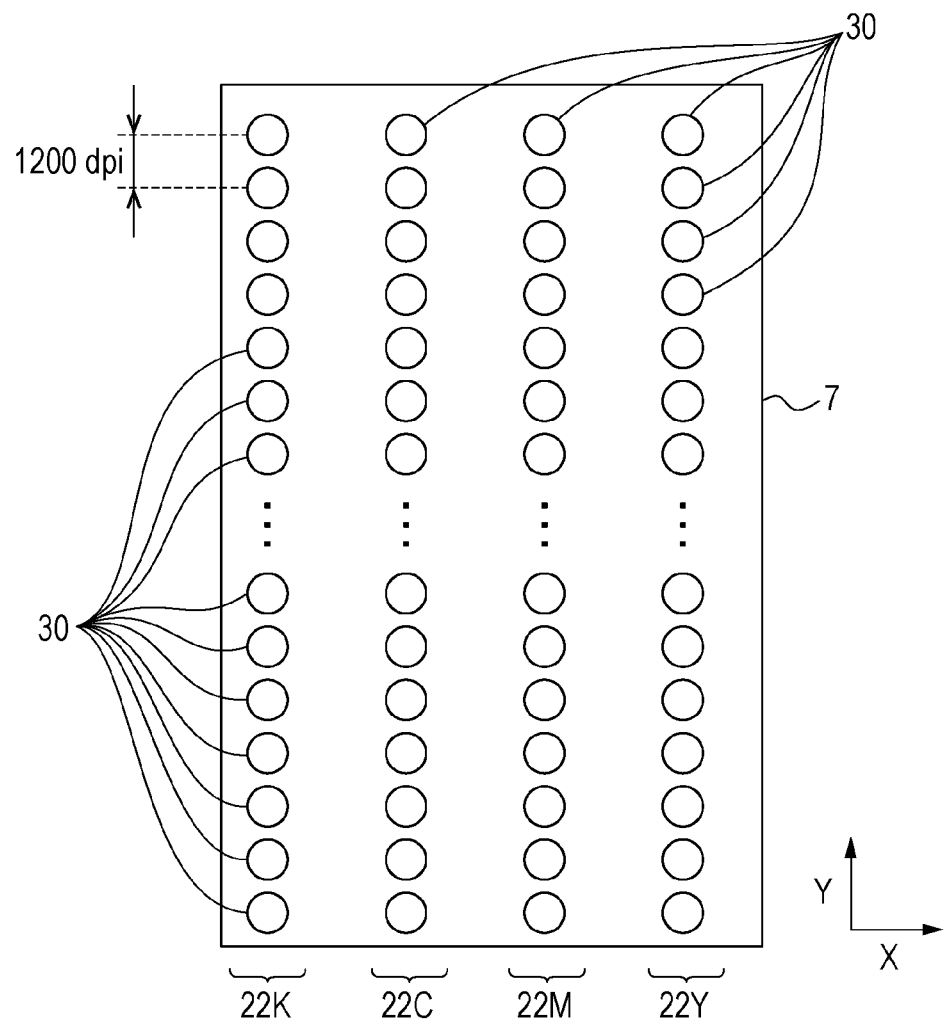
FIG. 6 is a diagram schematically illustrating a printing head according to the first embodiment.

FIG. 6 is a diagram schematically illustrating the printing head 7 of this embodiment.

The printing head 7 includes four discharge port arrays 22K, 22C, 22M, and 22Y which discharge ink of black (K), ink of cyan (C), ink of magenta (M), and ink of yellow (Y), respectively, and which are arranged in parallel in the X direction. Each of the discharge port arrays 22K, 22C, 22M, and 22Y has 1440 (N, or a predetermined number of) discharge ports 30 arranged in the Y direction (array direction) in a density of 1200 dpi. An amount of ink discharged from one of the discharge ports 30 is approximately 4.5 ng in this embodiment.

The discharge port arrays 22K, 22C, 22M, and 22Y are connected to respective ink tanks, not illustrated, which store the corresponding inks, and the inks are supplied from the ink tanks. The printing head 7 and the ink tanks of this embodiment may be integrated or may be separated from one another.

Figure 7:
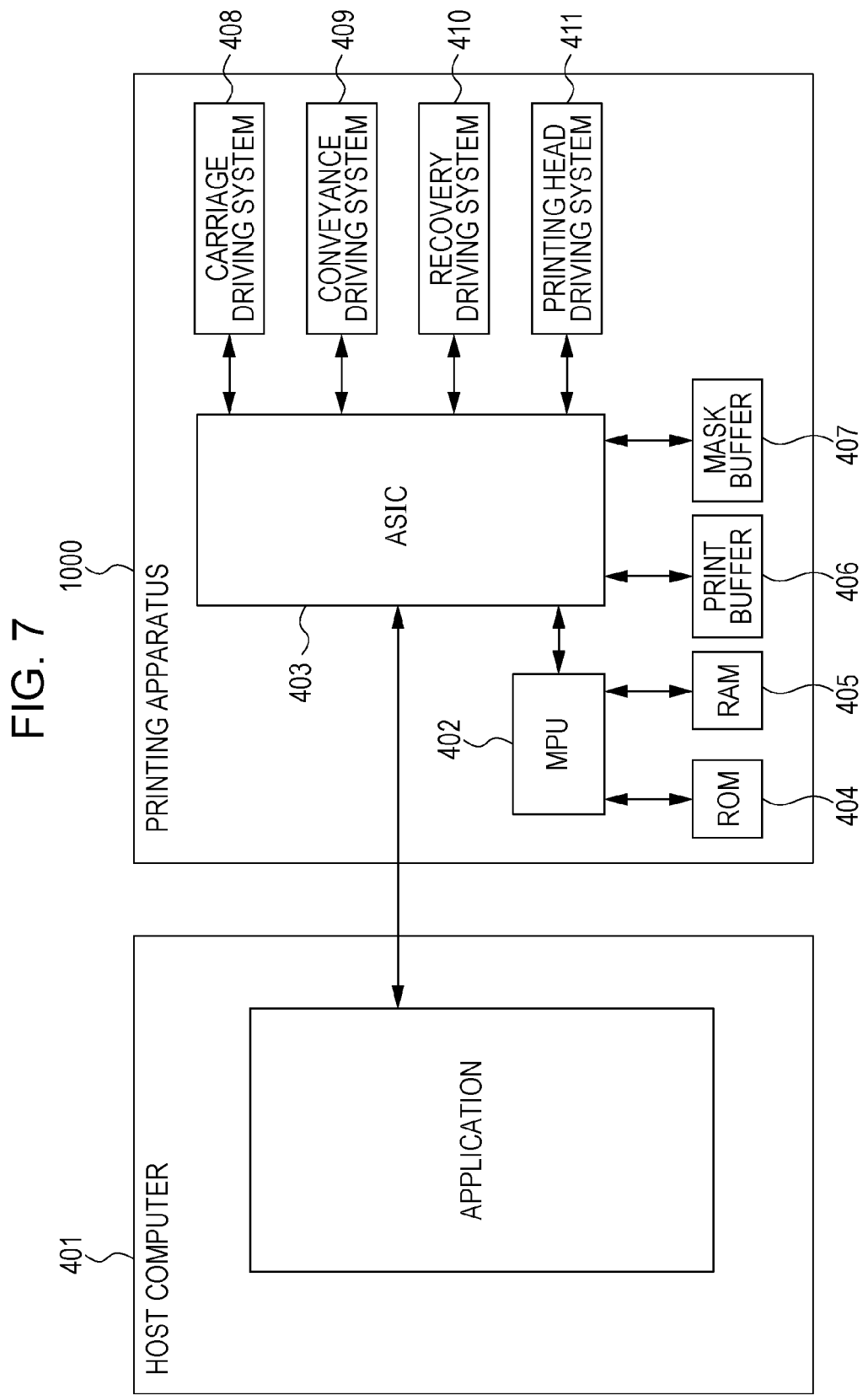
FIG. 7 is a block diagram illustrating a configuration of a printing control system according to the first embodiment.

FIG. 7 is a block diagram schematically illustrating a configuration of a printing control system according to this embodiment.

A host computer 401 serving as an image input unit transmits multivalued image data of an RGB format stored in a storage medium, such as a hard disk, to an image processing unit included in the printing apparatus 1000.

The image processing unit includes an MPU (Micro Processor Unit) 402 and an ASIC 403 which will be described hereinafter. Alternatively, multivalued image data may be supplied from an external image input device, such as a scanner or a digital still camera, connected to the host computer 401. The image processing unit performs image processing, which will be described hereinafter, on the input multivalued image data so as to convert the multivalued image data into binary image data. In this way, the binary image data which is printing data generated by discharging a plurality of types of ink from the printing head 7 is generated.

The printing apparatus 1000 serving as an image output unit assigns the inks to the printing medium 3 on the basis of the binary image data of the inks generated by the image processing unit so as to print an image. The printing apparatus 1000 is controlled by the MPU 402 in accordance with a program recorded in a ROM 404. A RAM 405 serves as a work area of the MPU 402 or a temporal data storage region. The MPU 402 controls a driving system 408 for the carriage 6, a conveyance driving system 409 for the printing medium 3, a recovery driving system 410 for the printing head 7, and a driving system 411 for the printing head 7 through the ASIC 403.

A print buffer 406 temporarily stores printing data converted into data of a format which may be transferred to the printing head 7.

A mask buffer 407 temporarily stores a mask pattern used when the printing data is transferred to the printing head 7. A plurality of mask patterns used for multipass printing are stored in the ROM 404, and one of the mask patterns is read from the ROM 404 at a time of actual printing and stored in the mask buffer 407.

Although the case where the image processing unit is included in the printing apparatus 1000 is described in this embodiment, the image processing unit may be included in the host computer 401.

Figure 8:
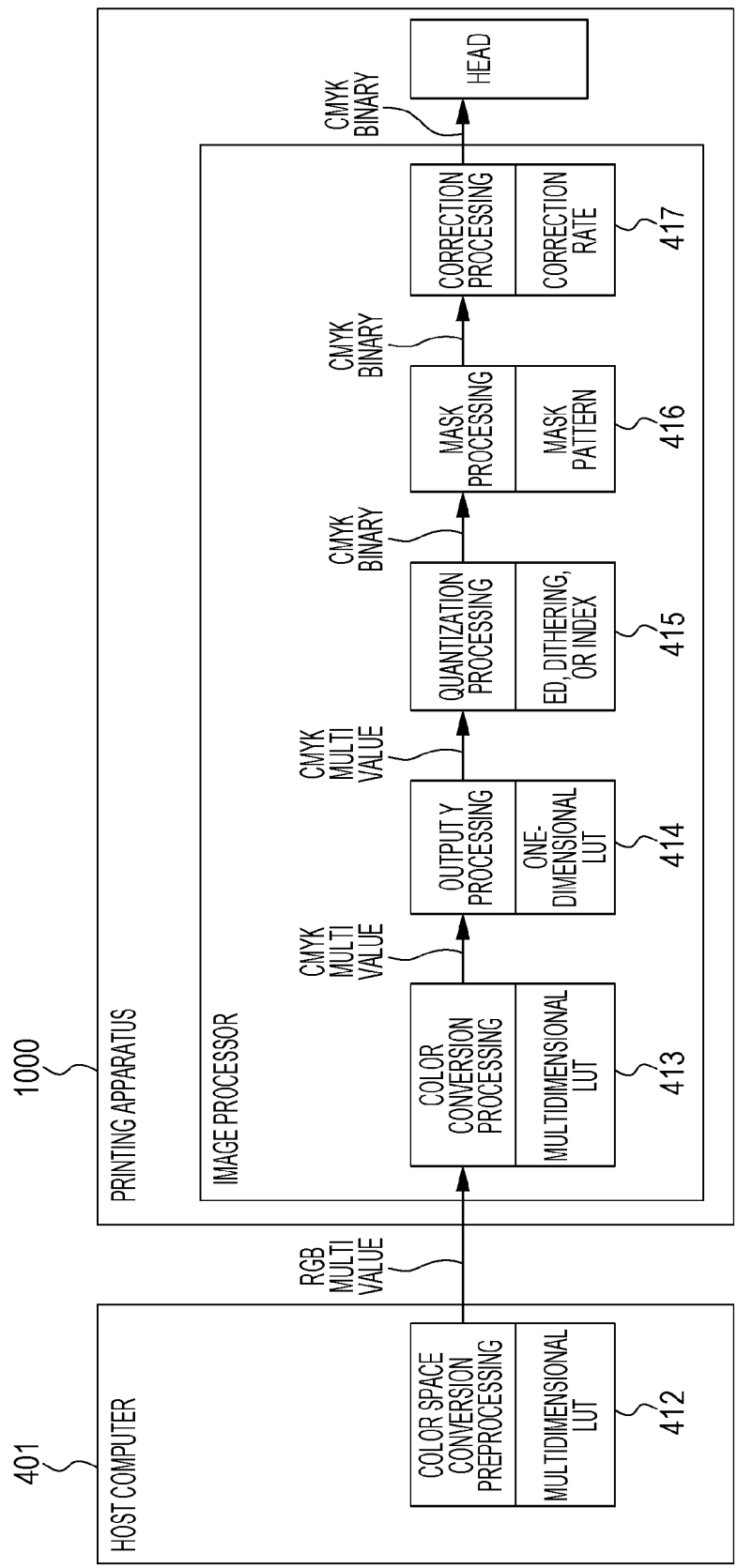
FIG. 8 is a block diagram illustrating data processing according to the first embodiment.

FIG. 8 is a flowchart illustrating the image processing according to this embodiment.

In the image processing according to this embodiment, multivalued image data (luminance data) of the RGB format in which each color has 8 bits (256 gradations) is obtained. Then a process of outputting binary data (printing data) of 1 bit for finally discharging the cyan ink, the magenta ink, the yellow ink, and the black ink for each scanning is performed. Types of color and gradations of color are not limited to these values.

First, in the host computer 401, a color-space conversion preprocessor 412 converts image data represented by a multivalued luminance signal of the RGB format into image data represented by a multivalued luminance signal of the RGB format to be input to the printing apparatus 1000 using multidimensional LUT. The color-space conversion preprocessing (hereinafter referred to as "precedent color processing" where appropriate) is performed to correct a difference between a color space of an input image represented by image data of R, G, and B of a printing target and a color space reproducible by the printing apparatus 1000. The image data of RGB format which has been subjected to the precedent color processing is supplied to the printing apparatus 1000.

A color conversion processor 413 converts the multivalued image data of the RGB format input by the host computer 401 into multivalued data of a CMYK format using a multidimensional LUT stored in the ROM 404. This color conversion process (hereinafter referred to as "subsequent color processing" where appropriate) is performed for color conversion of the image data of the RGB format of an input system represented by the luminance signal into the image data of the CMYK format of an output system to be represented by a density signal.

Next, an output gamma processor 414 performs output gamma correction on the multivalued data of the CMYK format which has been subjected to the subsequent color processing using one-dimensional LUTs of C, M, Y, and K. In general, the relationship between the number of dots printed per unit area of a printing medium and a printing characteristic such as a reflection density obtained by measuring a printed image is not the linear relationship. Therefore, the output gamma correction which corrects multivalued input gradation levels of C, M, Y, and K so that the input gradation levels of C, M, Y, and K and a density level of an image printed in accordance with the input gradation levels have the linear relationship.

Subsequently, a quantization processor 415 binarizes (quantizes) the multivalued data of C, M, Y, and K obtained as described above so as to obtain data in which each of the colors of C, M, Y, and K has one bit. In this embodiment, an error diffusion method is used as a binarization method. A quantization method using the error diffusion method is a general technique, and therefore, a description thereof is omitted. Instead of the error diffusion method, dithering may be used as the binarization method. Furthermore, index development using an index pattern may be additionally used.

A mask processor 416 generates binary data used for discharging the inks of C, M, Y, and K in individual scanning operations by employing a mask pattern for the binary data of the CMYK format. The mask pattern is formed by arranging a plurality of print permitting pixels and a plurality of non-print permitting pixels. Note that the print permitting pixel permits discharge of ink when binary data representing discharge of ink to a pixel region of a printing medium is input. On the other hand, the non-print permitting pixel does not permit discharge of ink even when binary data representing discharge of ink to a pixel region of a printing medium is input. Since printing is performed by one scanning operation on a non-overlap portion in this embodiment, mask processing is performed using a mask pattern including print permitting pixels arranged in all positions.

A correction processor 417 performs correction processing, such as thinning and adding, which will be described hereinafter, on binary data assigned to individual scanning operations by the mask processor 416.

A printing method according to this embodiment will be described in detail hereinafter.

Figure 9:
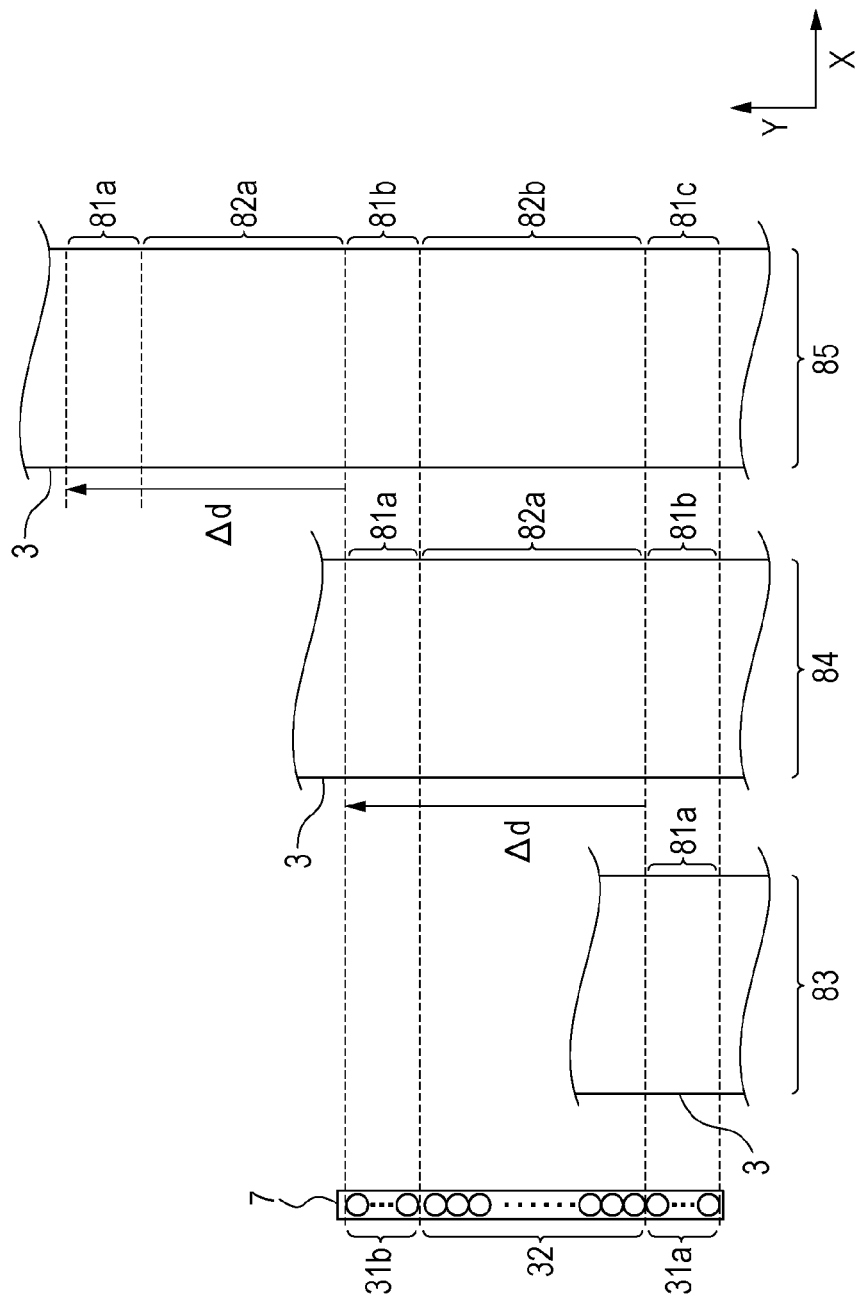
FIG. 9 is a diagram illustrating a printing method according to the first embodiment.

FIG. 9 is a diagram illustrating a printing method according to this embodiment. For simplicity, the printing head 7 includes only one discharge port array in FIG. 9.

In this embodiment, 1280 discharge ports included in the printing head 7 are divided into three discharge port groups, that is, a first discharge port group 31*a*, a second discharge port group 32, and a first discharge port group 31*b*. Here, the first discharge port group 31*a* includes 40 discharge ports disposed in an end portion on an upstream side in the Y direction of the discharge port array. The first discharge port group 31*b* includes 40 discharge ports disposed in an end portion on a downstream side in the Y direction of the discharge port array. The second discharge port group 32 includes 1200 discharge ports other than the discharge ports of the first discharge port groups 31*a* and 31*b*.

First, when a first scanning operation is to be performed, the printing medium 3 is conveyed so as to have the positional relationship with the printing head 7 represented by (83). With this positional relationship, the printing head 7 scans in the X direction, and ink is discharged from the first discharge port group 31*a* to an overlap portion (first region) 81*a* in the printing medium 3.

Next, the printing medium 3 is conveyed by a distance Δd in the Y direction so that the overlap portion 81*a* corresponding to the first discharge port group 31*a* has the positional relationship with the first discharge port group 31*b* represented by (84). Since this conveyance is performed by a distance corresponding to a number of discharge ports corresponding to a number obtained by adding the number of discharge ports included in the first discharge port group 31*a* and the number of discharge ports included in the second discharge port group 32, a value of Δd corresponds to 1240 (=40+1200) discharge ports. Specifically, assuming that the number of discharge ports arranged in the discharge port array is N, the number of discharge ports included in the first discharge port group 31*a* is M, and the number of times scanning is performed on a region other than the overlapping portion (hereinafter referred to as a non-overlap portion or a second region where appropriate) is K, the value Δd corresponds to (N−M)/K discharge ports. After this conveyance, the printing head 7 scans in the X direction and ink is discharged from the first discharge port groups 31*a* and 31*b* and the second discharge port group 32. Here, an overlap portion 81*b* and a non-overlap portion 82*a* are subjected to first discharge from the first discharge port group 31*a* and the second discharge port group 32, respectively. The overlap portion 81*a* is subjected to second discharge of ink from the first discharge port group 31*a*. By performing the scanning in the positional relationship represented by (84), formation of an image corresponding to the overlap portion 81*a* and the non-overlap portion 82*a* is completed.

Furthermore, the printing medium 3 is conveyed in the Y direction by the distance Δd which is the same as the distance of the conveyance described above so that the positional relationship between the printing medium 3 and the printing head 7 represented by (85) is obtained. With the positional relationship represented by (85), the printing head 7 scans in the X direction, and as with the scanning in the positional relationship represented by (84), an image is formed in the overlap portion 81*b* and a non-overlap portion 82*b*.

Hereinafter, the conveyance of the printing medium 3 in the Y direction by the distance Δd and the scanning by the printing head 7 in the X direction with discharge of ink are alternately performed in a repetitive manner so that printing is performed on an entire region of the printing medium 3. According to the printing method described above, the printing may be performed by performing scanning once on the non-overlap portion of the printing medium 3 and twice on the overlap portions.

A correction process of this embodiment will now be described in detail hereinafter.

In this embodiment, discharge of ink is performed on the overlap portions by performing scanning twice as described above. Therefore, if the binary data is not thinned by the correction processor 417, discharged inks are overlapped with each other in the same pixel region by the two scanning operation. Accordingly, in a case where a so-called solid image is to be printed on the entire region of the printing medium 3 by discharging ink drop by drop on the pixel region on the printing medium 3 to which the ink is dischargeable (that is, a printing rate is 100%), if the thinning of binary data corresponding to the solid image is not performed, an image of a printing rate of 200% is formed in the overlap portions. That is, if the thinning of the binary data corresponding to the overlap portions is not performed, an image of a printing rate higher than that of an image to be printed is formed in the overlap portions.

Therefore, in this embodiment, the binary data is corrected by the correction processor 417 using different correction rates depending on a position on the printing medium 3 in the X direction. Note that, in this embodiment, the binary data corresponding to the overlap portions is thinned using thinning rates (reduction rates) as the correction rates so that the binary data is corrected and generation of black streaks is efficiently suppressed.

FIG. 10 is a diagram illustrating a process of printing an image on the printing medium 3 in accordance with the printing method illustrated in FIG. 9. Note that, in this embodiment, as the printing medium 3 moves, a printing position is changed as illustrated in FIG. 9, and in FIG. 10, the printing medium 3 is fixed and a position of the printing head 7 is changed in the Y direction. Here, the positional relationships between the printing head 7 and the printing medium 3 represented by (83), (84), and (85) in FIG. 10 correspond to the positional relationships between the printing head 7 and the printing medium 3 represented by (83), (84), and (85) in FIG. 9. For simplicity, only discharge of ink from the first discharge port group 31*a* in the positional relationship represented by (83) and discharge of ink from the first discharge port group 31*b* in the positional relationship represented by (84) are described hereinafter. Furthermore, in this embodiment, printing is performed by scanning in only one direction, that is, the X direction, of the printing head 7.

In this embodiment, the overlap portions in the printing medium 3 are divided into three regions, that is, a region A having a width of 20 mm from the end portion on the upstream side in the X direction, a region C having a width of 20 mm from the end portion on the downstream side in the X direction, and a region B which is other than the regions A and C.

First, strengths of incoming airflows flowing in the regions A, B, and C will be described in detail hereinafter.

Since the suction holes 26 are formed on the platen 2 which is adjacent on the upstream side in the X direction in the region A, an incoming airflow Q flows in the region A from the downstream side to the upstream side in the X direction. Similarly, an incoming airflow P flows in the region C from the upstream side to the downstream side in the X direction.

When the printing head 7 performs scanning, an incoming airflow R flows from the downstream side to the upstream side in the X direction. Specifically, the incoming airflow R flows in a direction which is the same as that of the incoming airflow Q and which is opposite to that of the incoming airflow P. The incoming airflow R having the same strength is generated in any of the regions A, B, and C irrespective of a position of the printing head 7.

Therefore, an airflow of a mixture of the incoming airflow R and the incoming airflow Q flows in the region A, and accordingly, an airflow stronger than the incoming airflow R flowing in the region B flows in the region A. On the other hand, the incoming airflow P flows in a direction in which the incoming airflow P cancels the incoming airflow R in the region C, and accordingly, an airflow weaker than the incoming airflow in the region B flows in the region C. Consequently, in the overlap portion 81a, the incoming airflow is strongest in the region A and weakest in the region C.

Furthermore, as described above, in a case where an incoming airflow is relatively strong, even when air in a space between the printing head 7 and the printing medium 3 is tend to be depressurized by self-airflow, air is added by an incoming airflow, and accordingly, a degree of the end deviation phenomenon is relatively small. Therefore, black streaks are likely to be generated in the overlap portion 81a of the printing medium 3.

Accordingly, it is determined that black streaks are likely to be generated in the region A of the overlap portion 81a since a degree of the end deviation phenomenon is small whereas black streaks are rarely generated in the region C since a degree of the end deviation phenomenon is large.

Accordingly, in this embodiment, the binary data is thinned using different thinning rates for the regions A to C included in the overlap portion 81a and a discharge amount of ink is reduced so that generation of the boundary streaks described above is suppressed.

FIGS. 11A to 11F are diagrams schematically illustrating thinning rates used when the correction processor 417 thins the binary data when ink is discharged to the overlap portion 81a in this embodiment. FIGS. 12A to 12C are diagrams schematically illustrating printing rates of binary data in the individual regions generated when the binary data corresponding to the solid image is thinned in accordance with the thinning rates illustrated in FIGS. 11A to 11F.

Figure 11A:
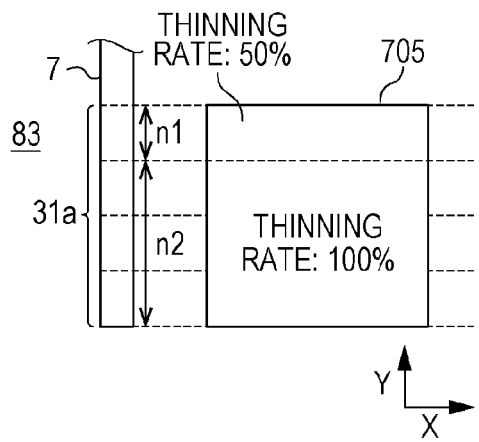
FIGS. 11A to 11F are diagrams schematically illustrating thinning rates according to the first embodiment.
Figure 11B:
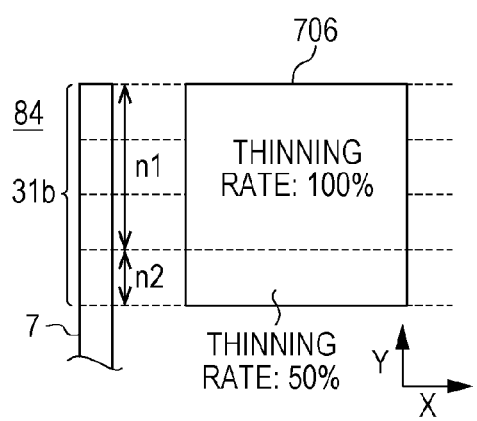
Figure 11C:
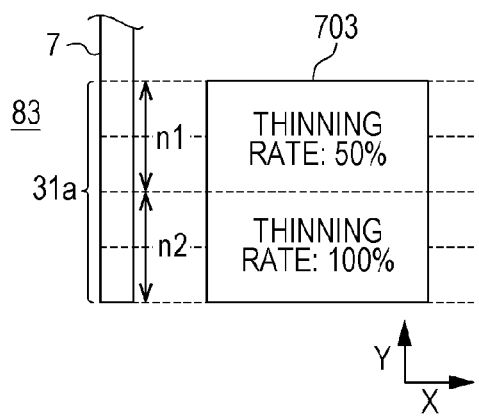
Figure 11D:
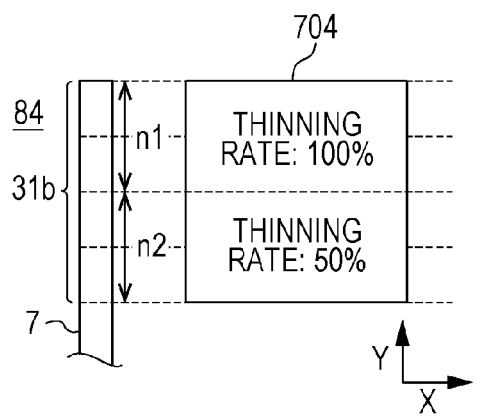
Figure 11E:
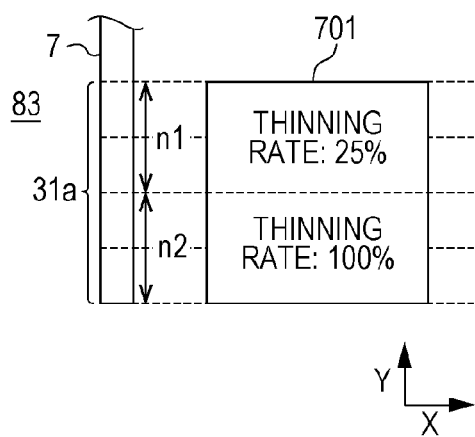
Figure 11F:
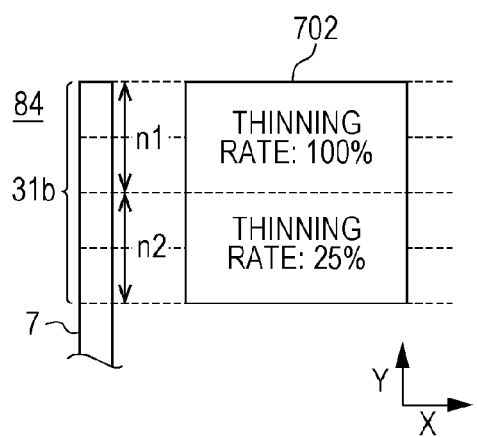
Figure 12A:
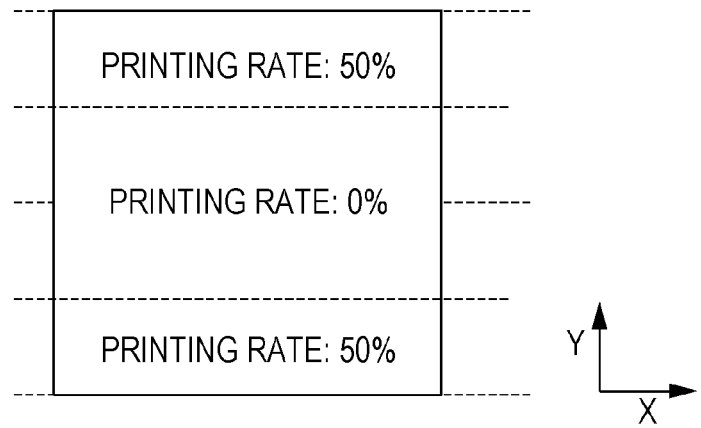
FIGS. 12A to 12C are diagrams illustrating printing rates of a printed image according to the first embodiment.
Figure 12B:
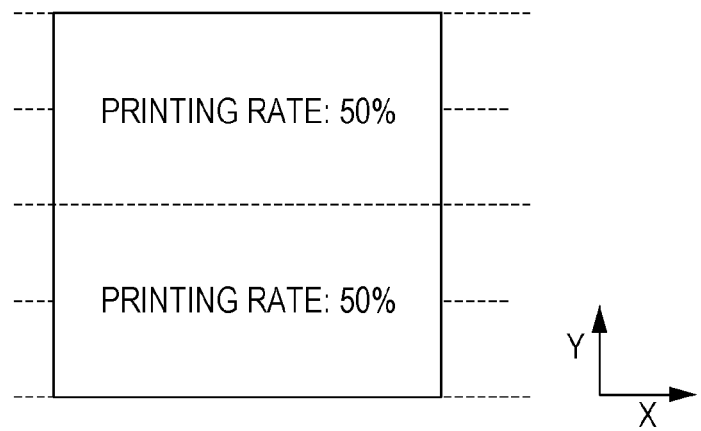
Figure 12C:
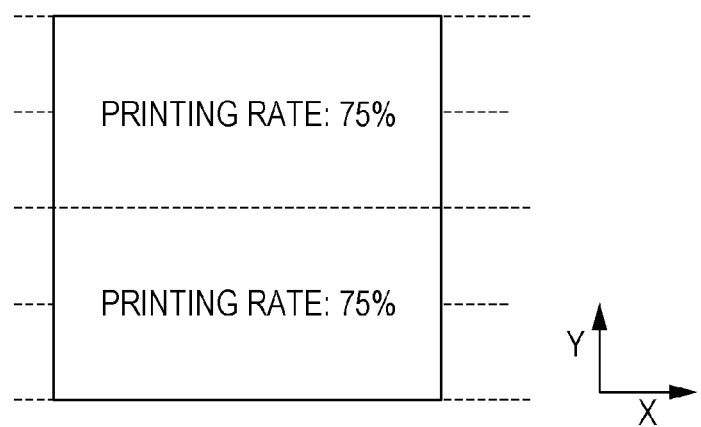

FIGS. 11A, 11C, and 11E are diagrams illustrating thinning rates of the binary data corresponding to the first discharge port group 31a in a case where the positional relationship between the printing head 7 and the printing medium 3 is represented by (83) of FIG. 9. FIGS. 11B, 11D, and 11F are diagrams illustrating thinning rates of the binary data corresponding to the first discharge port group 31b in a case where the positional relationship between the printing head 7 and the printing medium 3 is represented by (84) of FIG. 9.

Furthermore, in FIGS. 11A and 11B, thinning rates used when the binary data corresponding to the region A included in the overlap portions 81a and 81b are illustrated. Similarly, in FIGS. 11C and 11D, thinning rates used when the binary data corresponding to the region B included in the overlap portions 81a and 81b are illustrated. Similarly, in FIGS. 11E and 11F, thinning rates used when the binary data corresponding to the region C included in the overlap portions 81a and 81b are illustrated.

Furthermore, in FIGS. 12A to 12C, printing rates of the binary data corresponding to the regions A to C included in the overlap portions 81a and 81b are illustrated.

Here, as illustrated in FIGS. 11A, 11C, and 11E, the first discharge port group 31a is divided into a plurality of discharge ports n2 in the end portion on the upstream side in the Y direction and a plurality of discharge ports n1 on the downstream side in the Y direction, and different thinning rates are assigned between the discharge ports n1 and n2. Note that, in each of a group of the discharge ports n1 and a group of the discharge ports n2, substantially the same thinning rate is used. Furthermore, the thinning rate assigned to the discharge ports n2 corresponding to the end portion of the discharge port array is larger than that assigned to the discharge ports n1.

As illustrated in FIGS. 11B, 11D, and 11F, the first discharge port group 31b is similarly divided into the plurality of discharge ports n1 in the end portion on the downstream side in the Y direction and the plurality of discharge ports n2 on the upstream side in the Y direction. In the first discharge port group 31b, the discharge ports n1 corresponds to the end portion of the discharge port array, and therefore, a thinning rate assigned to the discharge ports n1 is larger than that assigned to the discharge ports n2.

Hereinafter, the thinning rates assigned to the individual regions in the discharge port groups 31a and 31b will be described in detail.

The thinning rates illustrated in FIGS. 11A to 11F are rates of thinning amounts of the binary data corresponding to a certain region to amounts of binary data corresponding to the region in the printing medium 3 generated by the quantization processor 415. Specifically, a printing rate $\gamma(\%)$ of printing data generated when a printing rate of the binary data is $\alpha(\%)$ and a thinning rate is $\beta(\%)$ may be calculated in accordance with Expression 1.

$$\gamma = \alpha(1 - \beta/100) \tag{1}$$

For example, in a case where a thinning rate of 100% is set to binary data of a printing rate of 100% relative to the solid image, the binary data is thinned in accordance with the thinning rate of 100%. Specifically, the binary data of the printing rate of 100% is converted into printing data of a printing rate of 0% ($=100\% \times (1-100\%/100)$) corresponding to an image in which ink is not discharged in any pixel region on the printing medium 3. Furthermore, in a case where a thinning rate of 50% is set to binary data of a printing rate of 100%, the binary data is thinned in accordance with the thinning rate of 50% relative to the binary data. By this, the binary data of the printing rate of 100% is converted into binary data of a printing rate of 50% ($=100\% \times (1-50/100)$).

In this embodiment, as described below, only a configuration in which binary data is thinned is described to address the case where black streaks are likely to be generated in any of the regions. However, an embodiment in another mode may be employed. Specifically, when white streaks are likely to be generated, binary data is added in accordance with an addition rate (increase rate) and a discharge amount of ink is increased so that generation of white streaks is suppressed. In this case, a printing rate γ(%) of printing data generated when a printing rate of the binary data is α(%) and an addition rate is β(%) may be calculated in accordance with Expression 2.

$$\gamma=\alpha(1+\delta/100) \quad (2)$$

In the region C illustrated in FIG. 10, since the incoming airflow R caused by the scanning is cancelled by the incoming airflow P caused by the absorption as described above, the number of generated black streaks is small. Therefore, in the region C, as illustrated in FIGS. 11E and 11F, thinning rates 701 and 702 which are smaller than thinning rates assigned to the regions A and B described below are assigned to the first discharge port groups 31a and 31b, respectively.

In the scanning of the printing head 7 in the positional relationship represented by (83) of FIGS. 9 and 10, the thinning rates 701 are set to the first discharge port group 31a as illustrated in FIG. 11E. Here, the first discharge port group 31a is divided such that the number of the discharge ports n1 and the number of the discharge ports n2 are equal to each other. A thinning rate of the discharge port n2 corresponding to the end portion of the discharge port array is set to 100% and a thinning rate of the discharge port n1 is set to 25%. Specifically, an average of the thinning rates 701 set to the first discharge port group 31a is 62.5% (=(100%+25%)/2).

In the scanning of the printing head 7 in the positional relationship represented by (84) of FIGS. 9 and 10, the thinning rates 702 are set to the first discharge port group 31b as illustrated in FIG. 11F. The thinning rates 702 and the thinning rates 701 have the opposite relationship.

The first discharge port group 31a having the thinning rates 701 assigned thereto and the first discharge port group 31b having the thinning rates 702 assigned thereto correspond to the region C in the overlap portion 81a. Therefore, when binary data (a printing rate of 100%) corresponding to the solid image is input to the correction processor 417 as data corresponding to the overlap portion 81a, for example, printing data of a printing rate of 75% is generated from the binary data as illustrated in FIG. 12C.

Subsequently, in the region B illustrated in FIGS. 9 and 10, only the incoming airflow R caused by the scanning flows since the suction holes 26 are not located in a neighboring area. Therefore, a degree of generation of in an incoming airflow is a middle degree, and a degree of generation of black streaks is also middle. Accordingly, in the region B, as illustrated in FIGS. 11C and 11D, thinning rates 703 and 704 which are larger than thinning rates 701 and 702 set to the region C are set to the first discharge port groups 31a and 31b. When ink is discharged from the first discharge port group 31a to the region B in the overlap portion 81a in the scanning performed by the printing head 7 in the positional relationship represented by (83) in FIGS. 9 and 10, thinning is performed on the binary data corresponding to the first discharge port group 31a in accordance with the thinning rates 703 illustrated in FIG. 11C. When ink is discharged from the first discharge port group 31b to the region B in the overlap portions 81a and 81b in the scanning performed by the printing head 7 in the positional relationship represented by (84) in FIGS. 9 and 10, thinning is performed on the binary data corresponding to the first discharge port group 31b in accordance with the thinning rates 704 illustrated in FIG. 11D.

Although a thinning rate of 25% is assigned to the discharge ports n1 in FIG. 11E, a thinning rate of 50% is assigned to the discharge ports n1 in FIG. 11C. Specifically, an average of the thinning rates 703 set to the first discharge port group 31a is 75% (=(100%+50%)/2). The thinning rates 704 illustrated in FIG. 11D and the thinning rates 703 have the opposite relationship.

When binary data of a printing rate of 100% is input to the correction processor 417, printing data to which a printing rate of 50% is set as illustrated in FIG. 12B is generated from the binary data.

Then, in the region A illustrated in FIGS. 9 and 10, the incoming airflow R caused by the scanning and the incoming airflow Q caused by the suction flow in the same direction, and accordingly, black streaks are most significantly generated. Therefore, when printing is performed on the region A, as illustrated in FIGS. 11A and 11B, thinning rates 705 and 706 which are larger than the thinning rates 703 and 704 set to the region B and the thinning rates 701 and 702 set to the region C are set. When ink is discharged from the first discharge port group 31a to the region A in the overlap portion 81a in the scanning performed by the printing head 7 in the positional relationship represented by (83) in FIGS. 9 and 10, thinning is performed on the binary data corresponding to the first discharge port group 31a in accordance with the thinning rates 705 illustrated in FIG. 11A. When ink is discharged from the first discharge port group 31b to the region A in the overlap portions 81a and 81b in the scanning performed by the printing head 7 in the positional relationship represented by (84) in FIGS. 9 and 10, thinning is performed on the binary data corresponding to the first discharge port group 31b in accordance with the thinning rates 706 illustrated in FIG. 11B.

The first discharge port group 31a corresponding to the region A are different from the first discharge port group 31a corresponding to the region B and the region C in that the discharge ports n1 is divided such that the number of discharge ports n1 is one-third of the number of discharge ports n2. Furthermore, thinning rates of the discharge ports n1 and the discharge ports n2 are set to 50% and 100%, respectively. Therefore, an average of the thinning rates 705 set to the first discharge port group 31a is 87.5% (=(100%×¾+50%×¼). On the other hand, the first discharge port group 31b corresponding to the region A are different from the first discharge port group 31a corresponding to the region A in that the discharge ports n2 is divided such that the number of discharge ports n2 is one-third of the number of discharge ports n1. Furthermore, thinning rates of the discharge ports n1 and the discharge ports n2 are set to 100% and 50%, respectively.

Accordingly, when binary data of a printing rate of 100% is input to the correction processor 417, printing data in which a printing rate of 50% is set to both end portions in the Y direction and a printing rate of 0% is set to a center portion in the Y direction as illustrated in FIG. 12A is generated from the binary data.

As described above, according to the thinning rates described in FIGS. 12A to 12C, in the overlap portions 81a and 81b, a printing rate of printing data corresponding to the region C may be large and a printing rate of printing data corresponding to the region A may be small.

By this, black streaks generated in the overlap portions 81a and 81b in different degrees in the scanning directions may be efficiently suppressed.

As described above, according to the configuration of this embodiment, even when an incoming airflow is increased or reduced in both end portions in a scanning direction of a printing medium due to suction of air through suction holes, printing may be performed while generation of boundary streaks is efficiently suppressed in entire regions of overlap portions in the scanning direction.

Comparative Example

A comparative example will be described in detail hereinafter.

Figure 13A:
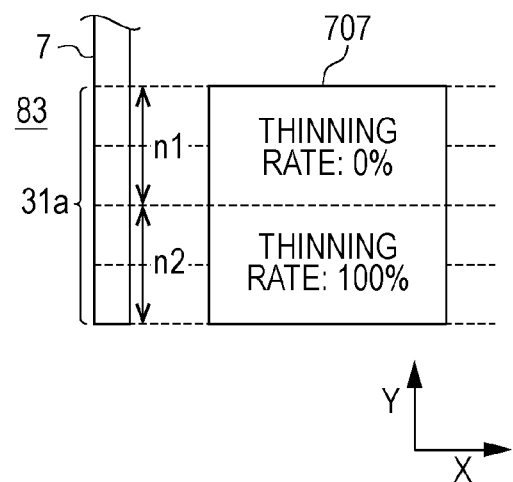
FIGS. 13A and 13B are diagrams schematically illustrating thinning ratios according to a comparative example.
Figure 13B:
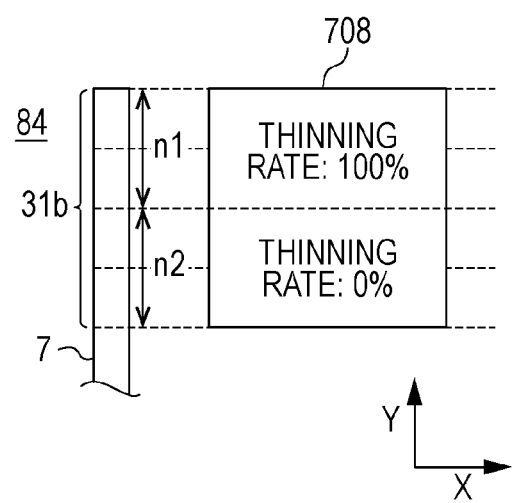

FIGS. 13A and 13B are diagrams schematically illustrating thinning rates set to binary data corresponding to an overlap portion in the comparative example. FIG. 13A is a diagram illustrating thinning rates 707 used when binary data corresponding to the first discharge port group 31*a* is thinned in a case where the positional relationship between a printing head 7 and a printing medium 3 is represented by (83) of FIG. 9. FIG. 13B is a diagram illustrating thinning rates 708 used when binary data corresponding to the first discharge port group 31*b* is thinned in a case where the positional relationship between the printing head 7 and the printing medium 3 is represented by (84) of FIG. 9.

As illustrated in FIGS. 13A and 13B, in the comparative example, the same thinning rates are used for thinning irrespective of a position in an X direction of the printing medium 3. Here, as illustrated in FIG. 13A, in the comparative example, a first discharge port group 31*a* is divided into a plurality of discharge ports n2 in an end portion on an upstream side in a Y direction and a plurality of discharge ports n1 on a downstream side in the Y direction. Furthermore, a thinning rate of 100% is set to binary data corresponding to the discharge ports n2 and a thinning rate of 0% is set to binary data corresponding to the discharge ports n1. Moreover, as illustrated in FIG. 13B, thinning rates 708 and thinning rates 707 have the opposite relationship.

In a case where binary data of a printing rate of 100% corresponding to a solid image is input to a correction processor 417, for example, by thinning the binary data using the thinning rates illustrated in FIGS. 13A and 13B, printing data in which, in the first discharge port group 31*a* in the positional relationship represented by (83), half of the discharge ports near the center in the Y direction have a printing rate of 100% and the other half of the discharge ports in an end portion in the Y direction has a printing rate of 0% is generated. On the other hand, printing data in which, in the first discharge port group 31*b* in the positional relationship represented by (84), half of the discharge ports near the center in the Y direction has a printing rate of 100% and the other half of the discharge ports in the end portion in the Y direction has a printing rate of 0% is generated.

According to the printing data generated as described above, ink is discharged from the first discharge port group 31*a* in a printing rate of 100% in scanning in the positional relationship represented by (83) on a region on the downstream side in the Y direction in an overlap portion 81*a* of the printing medium 3. Furthermore, ink is discharged from the first discharge port group 31*b* in a printing rate of 100% in scanning in the positional relationship represented by (84) on a remaining region on the upstream side in the Y direction in the overlap portion 81*a*. Accordingly, the ink may be theoretically discharged in the printing rate of 100% to an entire region of the overlap portion 81*a*.

However, when the printing is performed with this printing method and the thinning rates, a self-airflow caused by the discharge of the ink and an incoming airflow caused by the scanning performed by the printing head 7 are generated. Accordingly, ink droplets are not landed in ideal positions and black streaks are generated in the overlap portion 81*a*. Furthermore, since an incoming airflow caused by suction of air through suction holes 26 on a platen 2 further flows in both end portions (regions A and C) of the printing medium 3 in the X direction, black streaks of different densities are generated in the center portion (region B) and the both end portions (regions A and C) in the X direction. Degrees of boundary streaks generated in a case where printing is performed in accordance with the printing method illustrated in FIG. 9 and the thinning rates illustrated in FIGS. 13A and 13B are illustrated in Table 1.

TABLE 1

| Region A | Region B | Region C |
| --- | --- | --- |
| black streak (large) | black streak (middle) | black streak (small) |

According to Table 1, black streaks are remarkably generated in the region A of the overlap portion 81*a*, and a degree of black streaks in the region C is smaller than those of the regions A and B. This is because a degree of an end deviation phenomenon is small in the region A since a strong incoming airflow is generated whereas a degree of the end deviation phenomenon is large in the region C since an incoming airflow generated in the region C is weak as described above.

As described above, in a case where printing data is generated by thinning binary data in accordance with the thinning rates illustrated in the comparative example, generation of black streaks is not efficiently suppressed, and accordingly, quality of an image is deteriorated.

Second Embodiment

In the first embodiment, the case where printing is performed only by scanning in one direction of a printing head is described.

On the other hand, in a second embodiment, a case where printing is performed by scanning using a printing head in a going direction (first direction) and a returning direction (second direction) will be described.

Descriptions of portions the same as those of the first embodiment described above are omitted.

FIG. 14 is a diagram illustrating a process of printing an image on a printing medium 3 in accordance with a printing method of this embodiment.

In this embodiment, as the printing medium 3 moves, a printing position is changed as illustrated in FIG. 9, and in FIG. 14, the printing medium 3 is fixed and a position of a printing head 7 is changed in the Y direction.

Also in this embodiment, as with the first embodiment, the printing medium 3 is divided into three regions, that is, a region A having a width of 20 mm from an end portion on an upstream side in an X direction, a region C having a width of 20 mm from an end portion on a downstream side in the X direction, and a region B which is other than the regions A and C.

In this embodiment, scanning in a going direction and scanning a returning direction along the X direction of the printing head 7 are alternately performed in a repetitive manner, and images are printed in non-overlap portions 82*c* and 82*d* in the printing medium 3 by performing scanning twice. Meanwhile, images are printed on overlap portions 81*d* and 81*e* by performing scanning three times. For example, an image is printed on the non-overlap portion 82*c* by performing an n-th scanning operation in the going direction in the positional relationship represented by (91) and an (n+1)-th scanning operation in the returning direction in the positional relationship represented by (92). Furthermore, an image is printed on the non-overlap portion 82*d* by performing an (n+1)-th scanning operation in the returning direction in the positional relationship represented by (92) and an (n+2)-th scanning operation in the going direction in the positional relationship represented by (93). Furthermore, an image is printed on the overlap portion 81d by performing the n-th scanning operation in the going direction in the positional relationship represented by (91), the (n+1)-th scanning operation in the returning direction in the positional relationship represented by (92), and the (n+2)-th scanning operation in the going direction in the positional relationship represented by (93). Furthermore, an image is printed on the overlap portion 81e by performing the (n+1)-th scanning operation in the returning direction in the positional relationship represented by (92), the (n+2)-th scanning operation in the going direction in the positional relationship represented by (93), and an (n+3)-th scanning operation in the returning direction in the positional relationship represented by (94). Between the scanning operation in the going direction and the scanning operation in the returning direction, the printing medium 3 is conveyed in the Y direction.

In this embodiment, since the printing is performed on the non-overlap portions by the two scanning operations as described above, a mask processor 416 illustrated in FIG. 8 divides binary data into the two scanning operations using two mask patterns.

Figure 15A:
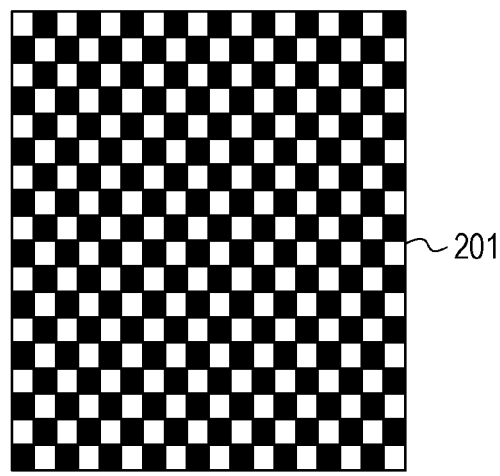
FIGS. 15A and 15B are diagrams schematically illustrating mask patterns according to the second embodiment.
Figure 15B:
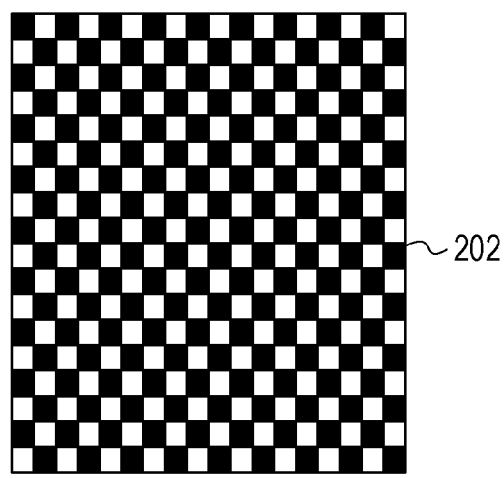

FIGS. 15A and 15B are diagrams schematically illustrating mask patterns according to the embodiment.

In FIG. 15A, a mask pattern 201 employed in the scanning in the going direction in the positional relationship represented by (91) and (93) of FIG. 14 is illustrated. In FIG. 15B, a mask pattern 202 employed in the (n+1)-th and (n+3)-th scanning operations in the returning direction in the positional relationship represented by (92) and (94) of FIG. 14 is illustrated.

Each of the mask patterns 201 and 202 is formed by arranging a plurality of print permitting pixels and a plurality of non-print permitting pixels. In FIGS. 15A and 15B, black portions represent the print permitting pixels and white portions represent the non-print permitting pixels.

The number of print permitting pixels and the number of non-print permitting pixels which are arranged in the mask pattern 201 are the same as each other. Therefore, when binary data of a printing rate of 100% relative to a solid image is input to the mask processor 416, binary data of a printing rate of 50% is generated for scanning in the going direction. Similarly, since the number of print permitting pixels and the number of non-print permitting pixels which are arranged in the mask pattern 202 are also the same as each other, binary data of a printing rate of 50% is generated for scanning in the returning direction.

Furthermore, the print permitting pixels in the mask pattern 202 are arranged in exclusionary and complementary positions relative to the print permitting pixels in the mask pattern 201. Therefore, the binary data assigned to the scanning in the going direction of the printing head 7 and the binary data assigned to the scanning in the returning direction have the exclusionary and complementary relationship.

According to the mask patterns 201 and 202, an image having a density corresponding to input image data may be printed in the non-overlap portions 82c and 82d in the printing medium 3.

Here, in the overlap portions 81d and 81e, ink is discharged twice in the scanning operations in the same direction, and therefore, black streaks are generated. Even when thinning is performed, as with the first embodiment, in accordance with the thinning rates illustrated in FIGS. 13A and 13B, black streaks are generated in the overlap portions 81d and 81e due to a self-airflow caused by the discharge of ink and an incoming airflow caused by the scanning performed by the printing head 7.

Furthermore, as with the first embodiment, degrees of generations of black streaks in the regions A, B, and C are different from one another due to an incoming airflow caused by suction of air in both end portions of the printing medium 3.

Moreover, since the printing is performed by reciprocation scanning according to this embodiment, degrees of generations of black streaks in the overlap portion 81d in which scanning in the going direction is performed twice and the overlap portion 81e in which scanning in the returning direction is performed twice are different from each other.

Table 2 illustrates the degrees of boundary streaks generated when printing data is generated by thinning binary data in accordance with the printing method illustrated in FIG. 14 and the thinning rates illustrated in FIGS. 13A and 13B.

TABLE 2

|  | Region A | Region B | Region C |
| --- | --- | --- | --- |
| Overlap Portion 81d | black streak (large) | black streak (middle) | black streak (small) |
| Overlap Portion 81e | black streak (small) | black streak (middle) | black streak (large) |

As illustrated in FIG. 14, an incoming airflow R caused by the scanning flows in the returning direction in the scanning in the going direction. Therefore, when incoming airflows P and Q caused by suction of air in the both end portions are also taken into consideration, an airflow which actually flows in the region A is strongest and an airflow which actually flows in the region C is weakest. By this, as illustrated in Table 2, in the overlap portion 81d in which the scanning operations in the going direction overlap with one another, black streaks are most remarkably generated in the region A whereas influence of black streak is small in the region C.

On the other hand, the incoming airflow R caused by the scanning flows in the going direction in the scanning in the returning direction. Therefore, an airflow which actually flows in the region C is strongest and an airflow which actually flows in the region A is weakest. Accordingly, in the overlap portion 81e in which the scanning operations in the returning direction overlap with one another, influence of black streaks is small in the region A whereas black streaks are remarkably generated in the region C.

Accordingly, in this embodiment, as illustrated in Table 3, when printing is performed on the regions A to C, thinning rates 705, 706, 703, 704, 701, and 702 illustrated in FIGS. 11A to 11F are set to the binary data of the regions A to C.

TABLE 3

|  | Region A | Region B | Region C |
| --- | --- | --- | --- |
| Overlap Portion 81d | 705, 706 | 703, 704 | 701, 702 |
| Overlap Portion 81e | 701, 702 | 703, 704 | 705, 706 |

As described above, according to this embodiment, even when an image is printed by reciprocation scanning, generation of boundary streaks caused by incoming airflows generated due to suction of air may be efficiently suppressed.

Third Embodiment

In the first and second embodiments, printing conditions, such as the printing rates (discharge amounts of ink) of the binary data input to the correction processor 417, a speed of scanning performed by the printing head 7, a distance between the printing head 7 and the platen 2 (hereinafter referred to as a "sheet-to-head distance" where appropriate), are not changed.

On the other hand, in a third embodiment, a case where the printing conditions are changed will be described.

Descriptions of portions the same as those of the first and second embodiments described above are omitted.

A degree of generation of boundary streaks may be changed in accordance with change of various printing conditions in addition to change of strength of incoming airflows caused by suction of air through suction holes.

Hereinafter, printing conditions which affect a degree of generation of boundary streaks will be described in detail.

Figure 16A:
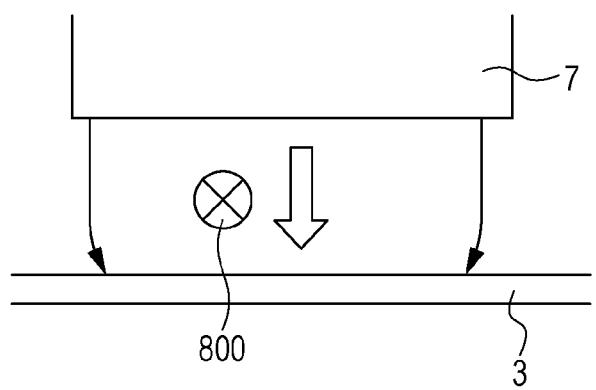
FIGS. 16A and 16B are diagrams illustrating deviation of ink droplets changed depending on a discharge amount of ink according to a third embodiment.
Figure 16B:
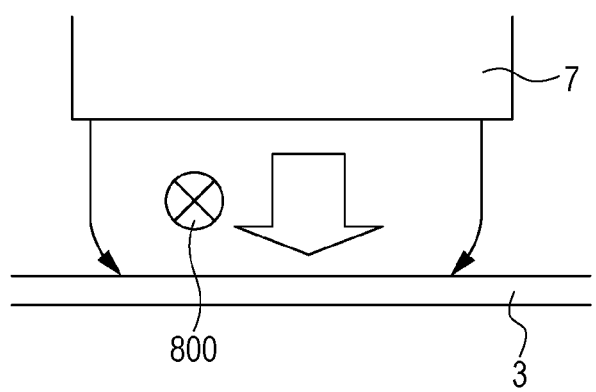

FIGS. 16A and 16B are diagrams illustrating a degree of generation of boundary streaks changed in accordance with a discharge amount of ink. A case where a discharge amount of ink is relatively small is described in FIG. 16A and a case where a discharge amount of ink is relatively large is described in FIG. 16B.

When a discharge amount of ink is relatively large, eddy of air caused by discharge of ink is remarkably generated, and accordingly, a relatively-large self-airflow is generated. Therefore, ink droplets are likely to be attracted toward a center portion of a printing head 7. Accordingly, when a discharge amount of ink is relatively large as illustrated in FIG. 16B, white streaks are likely to be generated when compared with the case where a discharge amount of ink is relatively small illustrated in FIG. 16A.

Furthermore, when a scanning speed of the printing head 7 in an X direction is relatively high, an amount of air flowing in a space between the printing head 7 and a printing medium 3 per unit time is large when compared with a case where a scanning speed is relatively low. That is, when the scanning speed is relatively high, an incoming airflow caused by the scanning of the printing head 7 is large. Therefore, correction of a depressurized state by the incoming airflow is dominant even when the self-airflow is large, and therefore, the ink droplets is not likely to be attracted toward the center portion of the printing head 7 and deviation toward end portions may be generated in some cases. Accordingly, when the scanning speed of the printing head 7 is relatively high, black streaks are likely to be generated when compared with the case where the scanning speed is relatively low.

Furthermore, a degree of generation of boundary streaks is changed also depending on the sheet-to-head distance.

Figure 17A:
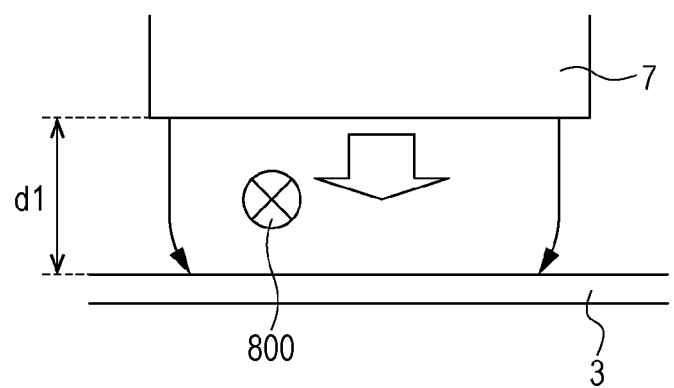
FIGS. 17A and 17B are diagrams illustrating deviation of ink droplets changed depending on a distance between a head and a sheet according to the third embodiment.
Figure 17B:
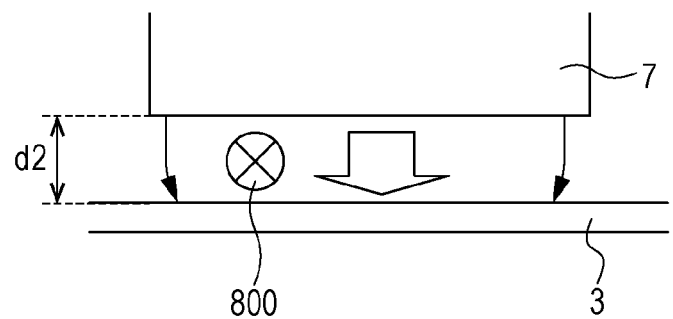

FIGS. 17A and 17B are diagrams illustrating a degree of generation of boundary streaks which is changed in accordance with the sheet-to-head distance. A case of a distance d1 which is a relatively long sheet-to-head distance is illustrated in FIG. 17A and a case of a distance d2 which is a relatively short sheet-to-head distance is illustrated in FIG. 17B.

In the case where the sheet-to-head distance is relatively small, even when deviation of ink droplets is generated by a degree substantially the same as that in the case where the sheet-to-head distance is large, an amount of the deviation of the ink droplets is relatively small since a period of time from when ink is discharged to when the ink is landed on the printing medium 3 is short. The amount of deviation is similarly reduced even in a case where the ink droplets are deviated toward the center portion of the printing head 7 and a case where the ink droplets are deviated toward the end portions. Accordingly, when the sheet-to-head distance is relatively small, white streaks and black streaks are unlikely to be generated when compared with the case where the sheet-to-head distance is comparatively large.

Accordingly, printing is performed in accordance with the printing method described with reference to FIG. 14 using different printing rates of binary data which is information relating to a discharge amount of ink, different scanning speeds of the printing head 7, and different sheet-to-head distances. Degrees of generation of boundary streaks in an overlap portion 81e obtained when different printing conditions are employed as described above are illustrated in Table 4. For simplicity, a description of an overlap portion 81d is omitted.

TABLE 4

| Sheet-to-Head Distance | Scanning Speed | Printing rate | Region A | Region B | Region C |
|---|---|---|---|---|---|
| 2.0 | 40 ips | 50% | White Streak (Middle) | — | Black Streak (Middle) |
| 2.0 | 40 ips | 25% | — | Black Streak (Middle) | Black Streak (Large) |
| 1.0 | 40 ips | 50% | White Streak (Small) | — | Black Streak (Small) |
| 2.0 | 25 ips | 50% | White Streak (Large) | White Streak (Middle) | — |

It is experimentally recognized that white streaks are likely to be generated when a discharge amount of ink (printing rate) is relatively large, black streaks are likely to be generated when a scanning speed is relatively high, and boundary streaks are unlikely to be generated when a sheet-to-head distance is small.

Accordingly, a correction process is performed by thinning binary data using different thinning rates depending on the printing conditions described above in this embodiment.

The thinning rates of the binary data of this embodiment are illustrated in Table 5.

TABLE 5

| Sheet-to-Head Distance | Scanning Speed | Printing Rate | Scan | Region A Width [1/1200 dpi] | | Region A Thinning Rate [%] | | Region B Width [1/1200 dpi] | | Region B Thinning Rate [%] | | Region C Width [1/1200 dpi] | | Region C Thinning Rate [%] | |
|---|---|---|---|---|---|---|---|---|---|---|---|---|---|---|---|
| | | | | n1 | n2 | n1 | n2 | n1 | n2 | n1 | n2 | n1 | n2 | n1 | n2 |
| 2.0 | 40 ips | 50% | (92) | 3 | 1 | 0 | 100 | 2 | 2 | 0 | 100 | 2 | 2 | 50 | 100 |
| | | | (94) | 1 | 3 | 100 | 0 | 2 | 2 | 100 | 0 | 2 | 2 | 100 | 50 |
| 2.0 | 40 ips | 25% | (92) | 2 | 2 | 0 | 100 | 2 | 2 | 50 | 100 | 2 | 2 | 60 | 100 |
| | | | (94) | 2 | 2 | 100 | 0 | 2 | 2 | 100 | 50 | 2 | 2 | 100 | 60 |
| 1.0 | 40 ips | 50% | (92) | 2 | 2 | 0 | 50 | 2 | 2 | 0 | 100 | 2 | 2 | 25 | 100 |
| | | | (94) | 2 | 2 | 50 | 0 | 2 | 2 | 100 | 0 | 2 | 2 | 100 | 25 |
| 2.0 | 25 ips | 50% | (92) | 2 | 2 | 0 | 0 | 3 | 1 | 0 | 100 | 2 | 2 | 0 | 100 |
| | | | (94) | 2 | 2 | 0 | 0 | 1 | 3 | 100 | 0 | 2 | 2 | 100 | 0 |

In Table 5, only ratios of the numbers of discharge ports n1 and the numbers of discharge ports n2 and thinning rates of binary data corresponding to the discharge ports n1 and the discharge ports n2 are illustrated. The thinning rates are the same as or similar to those illustrated in FIGS. 11A to 11F and FIGS. 13A and 13B in practice. For example, in a case where printing is performed on the region B in a condition in which the sheet-to-head distance is 2.0 mm, a scanning speed is 40 ips, and a printing rate is 50%, thinning rates 707 illustrated in FIG. 13A are employed in scanning in the positional relationship represented by (92) and thinning rates of 708 illustrated in FIG. 13B are employed in scanning in the positional relationship represented by (94). Furthermore, in a case where printing is performed on the region C in a condition in which a sheet-to-head distance is 2.0 mm, a scanning speed is 40 ips, and a printing rate is 50%, thinning rates 703 illustrated in FIG. 11C are employed in scanning in the positional relationship represented by (92) and thinning rates of 704 illustrated in FIG. 11D are employed in scanning in the positional relationship represented by (94). Moreover, in a case where printing is performed on the region C in a condition in which a sheet-to-head distance is 2.0 mm, a scanning speed is 40 ips, and a printing rate is 25%, thinning rates different from the thinning rates 703 illustrated in FIG. 11C in that the thinning rate corresponding to the discharge ports n1 of 50% is changed to 60% are employed in scanning in the positional relationship represented by (92). Furthermore, in the scanning in the positional relationship represented by (94), thinning rates different from the thinning rates 704 illustrated in FIG. 11D in that the thinning rate corresponding to the discharge ports n2 of 50% is changed to 60% is employed.

As described above, in this embodiment, when printing is performed on an overlap portion, different thinning rates are employed depending on printing conditions including a discharge amount of ink to the overlap portion, a scanning speed, and a sheet-to-head distance. By this, printing may be performed while boundary streaks generated in different degrees depending on printing conditions are effectively suppressed.

Furthermore, in the embodiments, the mode where a mask process is performed on binary data using a mask pattern, the binary data is divided for a plurality of scanning operations, and a correction process is performed by thinning the binary data in accordance with thinning rates has been described. However, other modes may be embodied. For example, in a case where printing is performed in accordance with the printing method illustrated in FIGS. 9 and 10, different mask patterns may be employed when printing is performed on the individual regions A, B, and C. In this case, a mask pattern corresponding to the region A, a mask pattern corresponding to the region B, and a mask pattern corresponding to the region C are combined such that a rate of the number of print permitting pixels to a sum of the number of print permitting pixels and the number of non-print permitting pixels is high in order of the mask pattern corresponding to the region A, the mask pattern corresponding to the region B, and the mask pattern corresponding to the region C.

Furthermore, in the embodiments, the mode in which a platen including a plurality of suction holes formed thereon in a range having a width larger than that of the printing medium 3 in the X direction is provided has been described. However, other modes may be embodied. For example, the present invention may be employed in a printing apparatus which is capable of performing printing on printing media of an A4 size and a postcard size, which has a plurality of suction holes covered by the printing medium when printing is performed on the printing medium of the A4 size, and which has the suction holes some of which are exposed when printing is performed on the printing medium of the postcard size. In this case, the correction process described in the embodiments is not performed when the printing is performed on the printing medium of the A4 size, but the correction process is performed when the printing is performed on the printing medium of the postcard size. By this, the effects of the present invention may be obtained.

Furthermore, although the mode in which the first discharge group is divided into the plurality of discharge ports n1 and the plurality of discharge ports n2 has been described in the embodiments, other modes may be embodied. Specifically, a uniform thinning rate may be defined in the first discharge group or the first discharge group may be divided into three or more.

Furthermore, although the mode in which the binary data is thinned or not corrected has been described in the embodiments, other modes may be embodied. For example, a case where a printing medium is conveyed such that a width of an overlap portion in a Y direction is smaller than those of the embodiments and a case where white streaks are more remarkably generated when compared with black streaks in overlap portions when a scanning speed of a printing head is considerably low may be considered. In these cases, generation of white streaks may be suppressed to some extent by adding binary data in accordance with an addition rate. Printing rates of the print data may be calculated in accordance with Expression 2 above in these cases.

Furthermore, although the binary data is divided for a plurality of scanning operations using the mask pattern in the embodiments, means for the division is not limited to the mask pattern. For example, printing data of individual pixels are sequentially assigned to a plurality of buffers corresponding to a plurality of scanning operations using an assigning circuit included in a printing apparatus, and scanning operations for printing the individual pixels may be determined. According to the assigning circuit described above, the numbers of times scanning is performed before ink is discharged to the individual pixels may be controlled. Even the embodiment in which binary data is divided for a plurality of scanning operations using the assigning circuit may attain the effects of the present invention.

Furthermore, in the embodiments, a so-called thermal jet inkjet printing apparatus which discharges ink by energy of bubble generation caused by heating and a printing method thereof are described. However, the present invention is not limited to the thermal jet inkjet printing apparatus, and may be employed in various print control apparatuses including a so-called piezo inkjet printing apparatus which discharges ink using piezoelectric elements.

Furthermore, although a printing method using a printing apparatus is described in each of the embodiments, an image processing apparatus and an image processing method for generating data used to perform the printing methods described in the embodiments may be employed. Moreover, the present invention may be widely employed in a mode in which a program is provided separately from a printing apparatus, a mode in which a program is included in a printing apparatus, and the like.

According to the printing apparatus of this embodiment, an image which is less affected by boundary streaks generated by different densities depending on scanning directions caused by different strengths of incoming airflows may be printed.

Other Embodiments

Embodiments of the present invention can also be realized by a computer of a system or apparatus that reads out and executes computer executable instructions printed on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-069578, filed in Mar. 28, 2014, which is hereby incorporated by reference herein in its entirety.

What is claimed is:

1. A printing apparatus comprising:
a printing head including a discharge port array which includes a plurality of discharge ports for discharging ink arranged in an array direction;
a suction unit configured to suction air through suction holes so as to attract a printing medium;
a scanning unit configured to cause the printing head to perform a plurality of scanning operations relative to the printing medium in a scanning direction which is orthogonal to the array direction;
a supporting unit which includes the suction holes formed therein in a range having a width in the scanning direction larger than a width of the printing medium in the scanning direction and which is configured to support the printing medium;
a conveying unit configured to convey the printing medium in a conveyance direction crosses the scanning direction relative to the printing head such that a predetermined number of first discharge ports arranged in one end portion of the discharge port array in the array direction in a first scanning operation in the plurality of scanning operations and a predetermined number of second discharge ports arranged in the other end portion in the discharge port array in the array direction in a second scanning operation which is performed after the first scanning operation in the plurality of scanning operations performed by the printing head discharge ink in the same region or substantially the same region in the printing medium;
an obtaining unit configured to obtain information on discharge amounts of ink discharged on the printing medium in the individual scanning operations;
a correction unit configured to perform correction by reducing a discharge amount of ink discharged from the predetermined number of first discharge ports in the first scanning operation and a discharge amount of ink discharged from the predetermined number of second discharge ports in the second scanning operation which are represented by the information obtained by the obtaining unit using reduction rates in accordance with a position of the printing head in the scanning direction; and
a controller configured to perform control such that ink is discharged in accordance with a discharge amount of ink corrected by the correction unit,
wherein, as for the discharge amount of ink discharged from the predetermined number of first discharge ports in the first scanning operation, the reduction rates in a case where the printing head is located in a first position in the scanning direction are larger than the reduction rates in a case where the printing head is located in a second position in the scanning direction which is on a downstream side in the scanning direction in the first scanning operation relative to the first position.

2. The printing apparatus according to claim 1, wherein as for the discharge amount of ink discharged from the predetermined number of first discharge ports in the first scanning operation, the reduction rates in a case where the printing head is located in a first region which is on an upstream side in the scanning direction in the first scanning operation relative to the first position are larger than the reduction rates in a case where the printing head is located in a second region which is on a downstream side in the scanning direction in the first scanning operation relative to the second position.

3. The printing apparatus according to claim 2, wherein the first region corresponds to the one end portion in the scanning direction and the second region corresponds to the other end portion in the scanning direction in the printing medium.

4. The printing apparatus according to claim 1, wherein as for the discharge amount of ink discharged from the predetermined number of first discharge ports in the first scanning operation, the reduction rates in a case where the printing head is located in a position between the first position and the second position in the scanning direction are smaller than the reduction rates in a case where the printing head is located in the first position in the scanning direction and larger than the reduction rates in a case where the printing head is located in the second position in the scanning direction.

5. The printing apparatus according to claim 1, wherein as for the discharge amount of ink discharged from the predetermined number of second discharge ports in the second scanning operation, the reduction rates in a case where the printing head is located in a third position in the scanning direction are larger than the reduction rates in a case where the printing head is located in a fourth position in the scanning direction which is on a downstream side in the scanning direction in the second scanning operation relative to the third position.

6. The printing apparatus according to claim 5, wherein the scanning unit causes the printing head to perform reciprocating scanning in a going direction and a returning direction along the scanning direction,
the first and second scanning operations are performed in the same direction, and
the third position is the same as the first position in the scanning direction and the fourth position is the same as the second position in the scanning direction.

7. The printing apparatus according to claim 5, wherein the scanning unit causes the printing head to perform reciprocating scanning in a going direction and a returning direction along the scanning direction, the first scanning operation is performed in the going direction and the second scanning operation is performed in the returning direction, and the third position is the same as the second position in the scanning direction and the fourth position is the same as the first position in the scanning direction.

8. The printing apparatus according to claim 1, wherein as for the discharge amount of ink discharged from the predetermined number of first discharge ports in the first scanning operation, the reduction rates in a case where the printing head is located in the first position in the scanning direction and a discharge amount of ink discharged from the predetermined number of first discharge ports represented by the information obtained by the obtaining unit corresponds to a first discharge amount are larger than the reduction rates in a case where the printing head is located in the first position in the scanning direction and a discharge amount of ink discharged from the predetermined number of first discharge ports represented by the information obtained by the obtaining unit corresponds to a second discharge amount which is larger than the first discharge amount.

9. The printing apparatus according to claim 1, wherein as for the discharge amount of ink discharged from the predetermined number of first discharge ports in the first scanning operation, the reduction rates in a case where the printing head is located in the first position in the scanning direction and a distance between the printing head and the supporting unit corresponds to a first distance are smaller than the reduction rates in a case where the printing head is located in the first position in the scanning direction and a distance between the printing head and the supporting unit corresponds to a second distance which is larger than the first distance.

10. The printing apparatus according to claim 1, wherein as for the discharge amount of ink discharged from the predetermined number of first discharge ports in the first scanning operation, the reduction rates in a case where the printing head is located in the first position in the scanning direction and a scanning speed of the printing head is a first speed are larger than the reduction rates in a case where the printing head is located in the first position in the scanning direction and the scanning speed of the printing head is a second speed which is lower than the first speed.

11. The printing apparatus according to claim 1, wherein the obtaining unit obtains the information on a discharge amount of ink discharged on the printing medium in accordance with printing data which defines a pixel region in the printing medium to which the ink is to be discharged in each of the plurality of scanning operations, the correction unit corrects the printing data corresponding to the predetermined number of first discharge ports in the first scanning operation and the printing data corresponding to the predetermined number of second discharge ports in the second scanning operation using the reduction rates, and the controller performs control such that ink is discharged in accordance with the printing data corrected by the correction unit.

12. The printing apparatus according to claim 11, wherein the correction unit reduces the discharge amount of ink by thinning the printing data.

13. A printing apparatus comprising:
a printing head including a discharge port array which includes a plurality of discharge ports for discharging ink arranged in an array direction;
a suction unit configured to suction air through suction holes so as to attract a printing medium;
a scanning unit configured to cause the printing head to perform a plurality of scanning operations relative to the printing medium in a scanning direction which crosses the array direction;
a supporting unit which includes the suction holes formed therein in a range having a width in the scanning direction larger than a width of the printing medium in the scanning direction and which is configured to support the printing medium;
a conveying unit configured to convey the printing medium in a conveyance direction which crosses the scanning direction relative to the printing head such that a predetermined number of first discharge ports arranged in one end portion of the discharge port array in the array direction in a first scanning operation in the plurality of scanning operations and a predetermined number of second discharge ports arranged in the other end portion in the discharge port array in the array direction in a second scanning operation which is performed after the first scanning operation in the plurality of scanning operations performed by the printing head discharge ink in the same region or substantially the same region in the printing medium;
an obtaining unit configured to obtain information on discharge amounts of ink discharged on the printing medium in the individual scanning operations;
a correction unit configured to perform correction by increasing a discharge amount of ink discharged from the predetermined number of first discharge ports in the first scanning operation and a discharge amount of ink discharged from the predetermined number of second discharge ports in the second scanning operation which are represented by the information obtained by the obtaining unit using increase rates in accordance with a position of the printing head in the scanning direction; and
a controller configured to perform control such that ink is discharged in accordance with a discharge amount of ink corrected by the correction unit,
wherein, as for the discharge amount of ink discharged from the predetermined number of first discharge ports in the first scanning operation, the increase rates in a case where the printing head is located in a first position in the scanning direction are smaller than the increase rates in a case where the printing head is located in a second position in the scanning direction which is on a downstream side in the scanning direction in the first scanning operation relative to the first position.

14. The printing apparatus according to claim 13, wherein as for the discharge amount of ink discharged from the predetermined number of first discharge ports in the first scanning operation, the increase rates in a case where the printing head is located in the first position in the scanning direction and a discharge amount of ink discharged from the predetermined number of first discharge ports represented by the information obtained by the obtaining unit corresponds to a first discharge amount are smaller than the increase rates in a case where the printing head is located in the first position in the scanning direction and a discharge amount of ink discharged from the predetermined number of first discharge ports represented by the information obtained by the obtaining unit corresponds to a second discharge amount which is larger than the first discharge amount.

15. The printing apparatus according to claim 13, wherein as for the discharge amount of ink discharged from the predetermined number of first discharge ports in the first scanning operation, the increase rates in a case where the printing head is located in the first position in the scanning direction and a distance between the printing head and the supporting unit corresponds to a first distance are smaller than the increase rates in a case where the printing head is located in the first position in the scanning direction and a distance between the printing head and the supporting unit corresponds to a second distance which is larger than the first distance.

16. The printing apparatus according to claim 13, wherein as for the discharge amount of ink discharged from the predetermined number of first discharge ports in the first scanning operation, the increase rates in a case where the printing head is located in the first position in the scanning direction and a scanning speed of the printing head is a first speed are smaller than the increase rates in a case where the printing head is located in the first position in the scanning direction and the scanning speed of the printing head is a second speed which is lower than the first speed.

17. The printing apparatus according to claim 13, wherein the obtaining unit obtains the information on a discharge amount of ink discharged on the printing medium in accordance with printing data which defines a pixel region in the printing medium to which the ink is to be discharged in each of the plurality of scanning operations, the correction unit corrects the printing data corresponding to the predetermined number of first discharge ports in the first scanning operation and the printing data corresponding to the predetermined number of second discharge ports in the second scanning operation using the increase rates, and the controller performs control such that ink is discharged in accordance with the printing data corrected by the correction unit.

18. The printing apparatus according to claim 13, wherein the correction unit increases the discharge amount of ink by adding the printing data.

19. A printing method comprising:

causing a printing head including a discharge port array which includes a plurality of discharge ports for discharging ink arranged in an array direction to perform a plurality of scanning operations in a scanning direction which crosses the array direction relative to the printing medium;

suctioning air through a plurality of suction holes which are formed on a supporting unit supporting a printing medium and which are formed in a region having a width in the scanning direction which is larger than a width of the printing medium in the scanning direction so that the printing medium is attracted on the supporting unit;

conveying the printing medium in a conveyance direction which crosses the scanning direction relative to the printing head such that a predetermined number of first discharge ports arranged in one end portion of the discharge port array in the array direction in a first scanning operation in the plurality of scanning operations and a predetermined number of second discharge ports arranged in the other end portion in the discharge port array in the array direction in a second scanning operation which is performed after the first scanning operation in the plurality of scanning operations performed by the printing head discharge ink in the same region or substantially the same region in the printing medium;

obtaining information on discharge amounts of ink discharged on the printing medium in the individual scanning operations;

performing correction by reducing a discharge amount of ink discharged from the predetermined number of first discharge ports in the first scanning operation and a discharge amount of ink discharged from the predetermined number of second discharge ports in the second scanning operation which are represented by the obtained information using reduction rates in accordance with a position of the printing head in the scanning direction; and performing control such that ink is discharged in accordance with a corrected discharge amount of ink, wherein, as for the discharge amount of ink discharged from the predetermined number of first discharge ports in the first scanning operation, the reduction rates in a case where the printing head is located in a first position in the scanning direction are larger than the reduction rates in a case where the printing head is located in a second position in the scanning direction which is on a downstream side in the scanning direction in the first scanning operation relative to the first position.

20. A program which operates a computer of a printing apparatus to execute the printing method set forth in claim 19.

* * * * *